US012641558B2

(12) United States Patent　　　　(10) Patent No.: US 12,641,558 B2

Kadiri et al.　　　　　　　　　　　　(45) Date of Patent:　May 26, 2026

(54) NETWORK SYNCHRONIZATION FOR MBS SFN

(71) Applicant: QUALCOMM Incorporated, San Diego, CA (US)

(72) Inventors: Prasad Reddy Kadiri, San Diego, CA (US); Xipeng Zhu, San Diego, CA (US); Miguel Griot, La Jolla, CA (US); Alberto Rico Alvarino, San Diego, CA (US); Umesh Phuyal, San Diego, CA (US); Le Liu, San Jose, CA (US); Kazuki Takeda, Minato-ku (JP); Luis Fernando Brisson Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/937,721

(22) Filed: Oct. 3, 2022

(65) Prior Publication Data

US 2023/0117359 A1　　Apr. 20, 2023

Related U.S. Application Data

(60) Provisional application No. 63/262,615, filed on Oct. 15, 2021.

(51) Int. Cl.
| | |
|---|---|
| *H04W 56/00* | (2009.01) |
| *H04W 4/06* | (2009.01) |
| *H04W 76/12* | (2018.01) |

(52) U.S. Cl.
CPC ......... *H04W 56/0025* (2013.01); *H04W 4/06* (2013.01); *H04W 76/12* (2018.02)

(58) Field of Classification Search
CPC ........... H04W 56/0025; H04W 56/001; H04W 56/0015; H04W 4/06; H04W 76/12; H04W 76/40; H04W 88/085
See application file for complete search history.

(56) References Cited

U.S. PATENT DOCUMENTS

| | | | | |
|---|---|---|---|---|
| 2019/0158259 | A1* | 5/2019 | Park | H04W 72/0446 |
| 2022/0337367 | A1* | 10/2022 | Zhu | H04W 72/30 |

(Continued)

FOREIGN PATENT DOCUMENTS

| | | | |
|---|---|---|---|
| CN | 115278548 A | * | 4/2021 |
| WO | 2021093154 A1 | | 5/2021 |

OTHER PUBLICATIONS

LTE MBMS SYNC protocol for support synchronization of content (Year: 2009).*

(Continued)

*Primary Examiner* — Yemane Mesfin
*Assistant Examiner* — Guoxing Fan
(74) *Attorney, Agent, or Firm* — QUALCOMM Incorporated

(57) ABSTRACT

A central unit (CU) transmits synchronization timing information for a multicast broadcast service (MBS) single frequency network (SFN) data transmission in a synchronous manner to multiple distributed units (DUs). The CU transmits the MBS SFN data transmission to the multiple DUs for synchronous transmission to one or more user equipments (UEs). A DU receives synchronization timing information for a MBS SFN data transmission in a synchronous manner with at least one additional DU. The DU transmits the MBS SFN data transmission with a timing based on the synchronization timing information.

31 Claims, 16 Drawing Sheets

(56) References Cited

U.S. PATENT DOCUMENTS

| | | | |
|---|---|---|---|
| 2023/0179960 A1* | 6/2023 | Mohammed Mikaeil ................... | H04W 72/30 370/329 |
| 2024/0048946 A1* | 2/2024 | Baek ................... | H04L 65/1096 |
| 2024/0057218 A1* | 2/2024 | Zhang ................... | H04W 76/12 |
| 2024/0147191 A1* | 5/2024 | Ling ....................... | H04W 4/06 |

OTHER PUBLICATIONS

International Search Report and Written Opinion—PCT/US2022/045680—ISA/EPO—Jan. 13, 2023.
Vargas D., et al., "Broadcast and Multicast Communication Enablers for the Fifth-Generation of Wireless Systems Deliverable D3.3 Ran Logical Architecture and Interfaces for 5G-Xcast", Feb. 28, 2019, XP055685520, 95 Pages, chapters 1-3. 5. 6. A.2, Paragraph [3.2.1], paragraph [3.2.2], paragraph [3.2.3].

\* cited by examiner

800

| Bits | | | | | | | | | No. of Octets | |
|---|---|---|---|---|---|---|---|---|---|---|
| 7 | 6 | 5 | 4 | 3 | 2 | 1 | 0 | | | |
| PDU Type (=1) | | | | Spare | | | | 1 | | Frame control part |
| Time Stamp ～ 804 | | | | | | | | 2 | | |
| Packet Number ～ 806 | | | | | | | | 2 | | |
| Elapsed Octet Counter | | | | | | | | 4 | | |
| Header CRC | | | | Payload CRC | | | | 2 | | Frame check sum part |
| Payload CRC | | | | | | | | | | |
| Payload fields | | | | | | | | 1-n | | Frame payload part |
| Payload fields | | | | Padding | | | | | | |
| Spare Extension | | | | | | | | 0-4 | | |

| Bits | | | | | | | | No. of Octets |
|---|---|---|---|---|---|---|---|---|
| 7 | 6 | 5 | 4 | 3 | 2 | 1 | 0 | |
| PDU Type = (0) | | | | Spare | DL discard blocks | DL flush | Report polling | 1 |
| Spare | SYNC | | Request outofseq report | Report delivered | User data existence flag | Assistance info report polling flag | ReTx flag | 1 |
| NR-U sequence number | | | | | | | | 3 |
| DL discard NR PDCP PDU SN | | | | | | | | 0 or 3 |
| Dl Discard Number of blocks | | | | | | | | 0 or 1 |
| DL discard NR PDCP PDU SN start (first block) | | | | | | | | 0 or 3 |
| Discarded Block size (first block) | | | | | | | | 0 or 1 |
| . . . | | | | | | | | |
| DL discard NR PDCP PDU SN start (last block) | | | | | | | | 0 or 3 |
| Discarded Block size (last block) | | | | | | | | 0 or 1 |
| DL report NR PDCP PDU SN | | | | | | | | 0 or 3 |
| Time Stamp | | | | | | | | 0 or 2 |
| Packet Number | | | | | | | | 0 or 2 |
| Padding | | | | | | | | 0-3 |

900

902

904

906

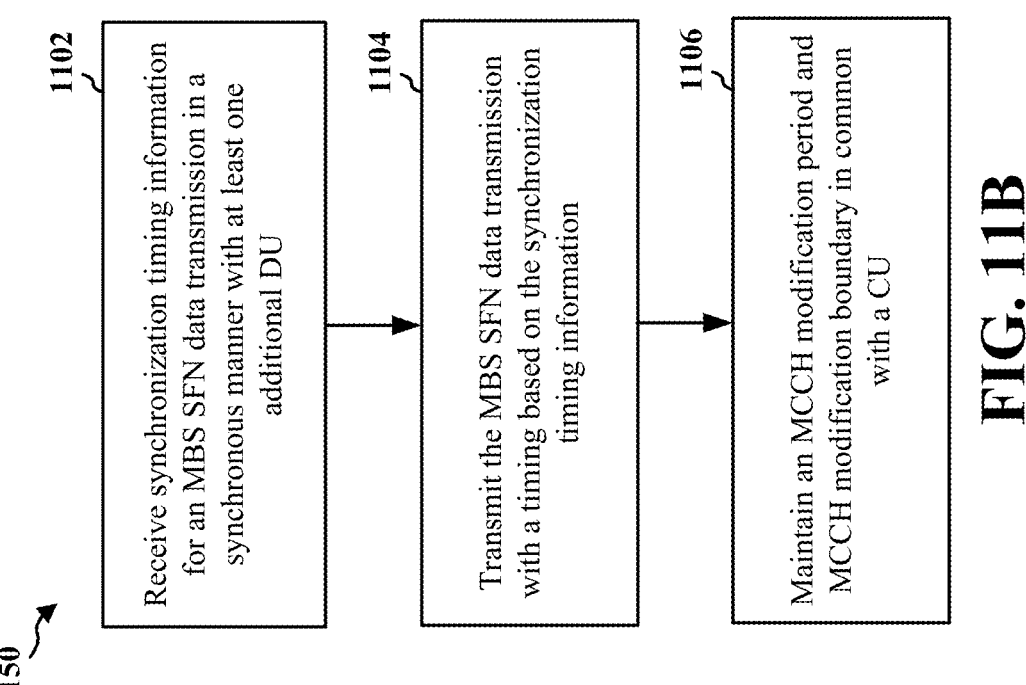

1150

1102 Receive synchronization timing information for an MBS SFN data transmission in a synchronous manner with at least one additional DU

1104 Transmit the MBS SFN data transmission with a timing based on the synchronization timing information

1106 Maintain an MCCH modification period and MCCH modification boundary in common with a CU

1102 Receive synchronization timing information for an MBS SFN data transmission in a synchronous manner with at least one additional DU

1104 Transmit the MBS SFN data transmission with a timing based on the synchronization timing information

FIG. 11A

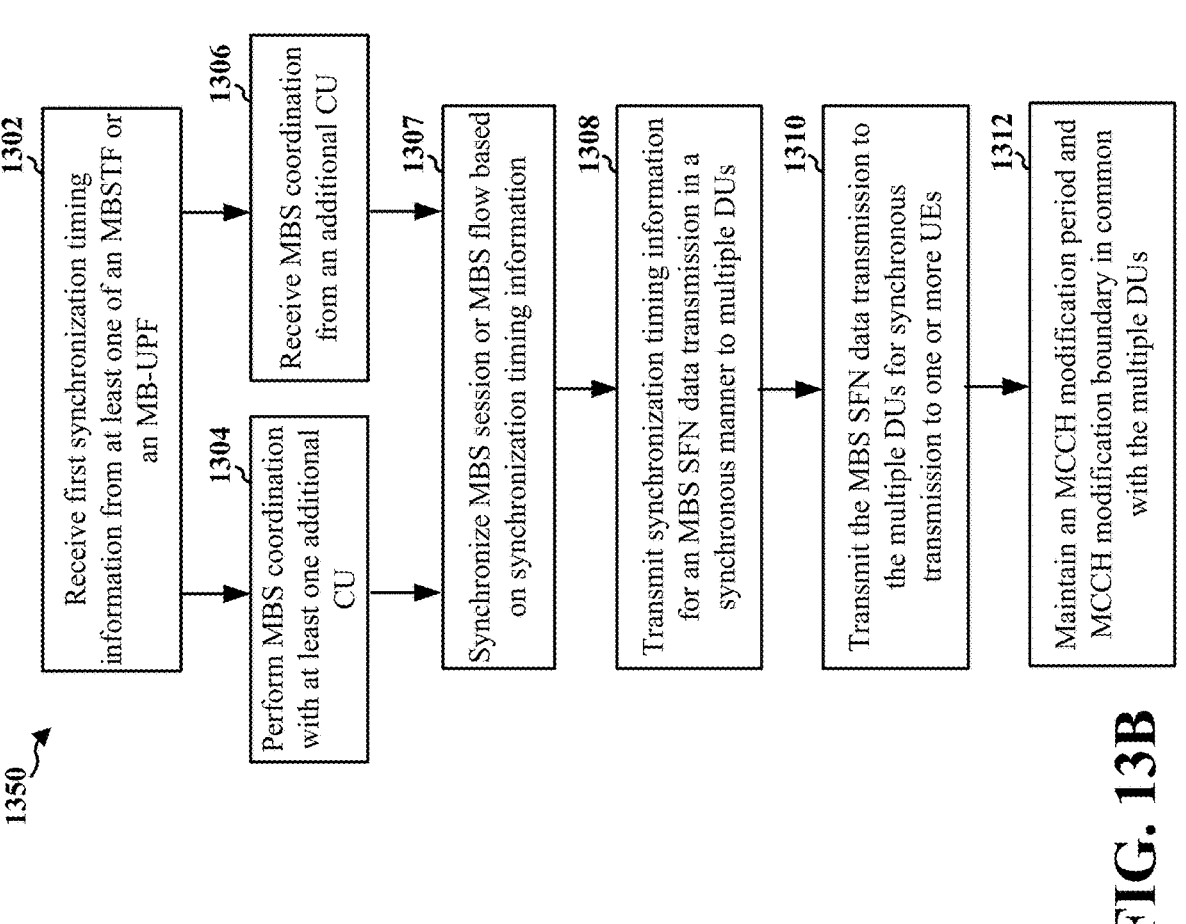

1350

1302 Receive first synchronization timing information from at least one of an MBSTF or an MB-UPF 1304 Perform MBS coordination with at least one additional CU 1306 Receive MBS coordination from an additional CU 1307 Synchronize MBS session or MBS flow based on synchronization timing information 1308 Transmit synchronization timing information for an MBS SFN data transmission in a synchronous manner to multiple DUs 1310 Transmit the MBS SFN data transmission to the multiple DUs for synchronous transmission to one or more UEs 1312 Maintain an MCCH modification period and MCCH modification boundary in common with the multiple DUs

1308 Transmit synchronization timing information for an MBS SFN data transmission in a synchronous manner to multiple DUs 1310 Transmit the MBS SFN data transmission to the multiple DUs for synchronous transmission to one or more UEs

FIG. 13A

NETWORK SYNCHRONIZATION FOR MBS SFN

CROSS REFERENCE TO RELATED APPLICATION(S)

This application claims the benefit of and priority to U.S. Provisional Application Ser. No. 63/262,615, entitled "NETWORK SYNCHRONIZATION FOR MBS SFN" and filed on Oct. 15, 2021, which is expressly incorporated by reference herein in its entirety.

TECHNICAL FIELD

The present disclosure relates generally to communication systems, and more particularly, to wireless communication include multicast broadcast service (MBS) transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a distributed unit (DU). The apparatus receives synchronization timing information for an MBS single frequency network (SFN) data transmission in a synchronous manner with at least one additional DU and transmits the MBS SFN data transmission with a timing based on the synchronization timing information.

In an aspect of the disclosure, a method, a computer-readable medium, and an apparatus are provided for communication at a central unit (CU). The apparatus transmits synchronization timing information for a MBS SFN data transmission in a synchronous manner to multiple DUs. The apparatus transmits the MBS SFN data transmission to the multiple DUs for synchronous transmission to one or more UEs.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 illustrates example aspects of a synchronization PDU, in accordance with various aspects of the present disclosure.

FIG. 9 illustrates an example of synchronization information elements included in a RAN container.

FIG. 11A and FIG. 11B are flowcharts of methods of wireless communication at a DU, in accordance with various aspects of the present disclosure.

FIGS. 13A and 13B are flowcharts of methods of wireless communication at a DU, in accordance with various aspects of the present disclosure.

DETAILED DESCRIPTION

Figure 1:
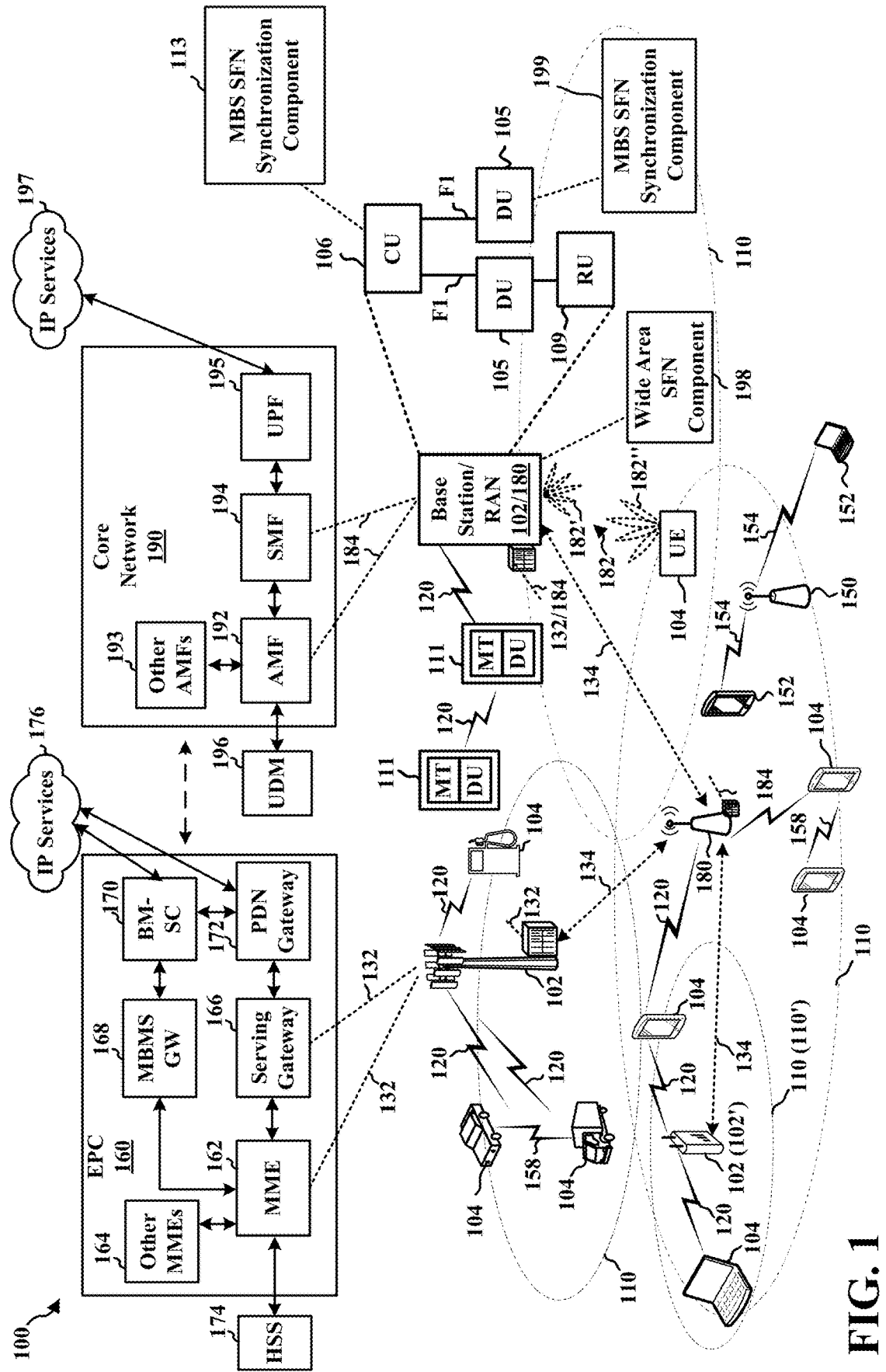
FIG. 1 is a diagram illustrating an example of a wireless communications system and an access network.

A single frequency network (SFN) may improve gain by turning inter-cell interference into a useful signal that may assist a UE in receiving downlink data with high quality. For example, the SFN transmits the same downlink signal from multiple cells at the same time and using the same frequency resources. Although the signal is transmitted by different cells, a UE receiving the signal may receive the signal as a signal from a single cell, and the multiple transmissions (e.g., from other cells) may improve the signal received by the UE. SFN transmission involves inter-cell coordination in order to transmit the signal at the same time and using the same frequency resources. In some aspects, the signal that is transmitted in the SFN may include multicast broadcast service (MBS) data. In some aspects, the multiple cells transmitting the MBS as an SFN may be connected to the same distributed unit (DU). The intra-DU SFN may provide a small area SFN among cells connected to the same DU.

Aspects presented herein enable the synchronization among different DUs to a common timing for an MBS SFN transmission across multiple DUs. The aspects enable a wide area SFN, e.g., for MBS. In some aspects, the wide area SFN may be an intra-central unit (CU), inter-DU SFN in which cells that are connected to different DUs of a same CU transmit the MBS as an SFN, e.g., in a synchronous manner using the same frequency resources. In other aspects, the wide area SFN may be an inter-CU, inter-DU SFN in which cells that are connected to different DUs of different CUs transit the MBS as an SFN. The aspects presented herein allow for improved MBS SFN communication across a larger area.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi access point (AP) 150 in communication with UEs 104 (also referred to as Wi-Fi stations (STAs))152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB (e.g., 180) may operate in a traditional sub 6 GHz spectrum, in millimeter wave frequencies, and/or near millimeter wave frequencies in communication with the UE 104. When the gNB (e.g., 180) operates in millimeter wave or near millimeter wave frequencies, the gNB (e.g., 180) may be referred to as a millimeter wave base station. The millimeter wave base station (e.g., 180) may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station 102 or 180 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 or 180 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to receive MBS transmissions, e.g., from a wide area SFN. In certain aspects, the base station 180 may include a wide area SFN component 198 that is configured to transmit an MBS in a synchronous manner across cells of different DUs and/or different CUs. The SFN may be an intra-CU, inter-DU wide area SFN, e.g., as described in connection with FIG. 6. The SFN may be an inter-CU, inter-DU wide area SFN, e.g., as described in connection with FIG. 10. One or more CUs 106 may include an MBS SFN synchronization component 113 that is configured to transmit synchronization timing information for an MBS SFN data transmission in a synchronous manner to multiple DUs. The MBS SFN synchronization component 113 may be further configured to receive first synchronization timing information from an MBSTF or an MB-UPF, where the synchronization timing information provided to the DUs is based on the synchronization timing information received from the MBSTF or the MB-UPF. One of more DUs may include a MBSTF or an MBS SFN synchronization component 199 that is configured to receive synchronization timing information for an MBS SFN data transmission in a synchronous manner with at least one additional DU and transmit the MBS SFN data transmission with a timing based on the synchronization timing information.

Although the following description may be focused on 5G NR, the concepts described herein may be applicable to other similar areas, such as LTE, LTE-A, CDMA, GSM, and other wireless technologies.

Figures 2A, 2B, 2C, 2D:
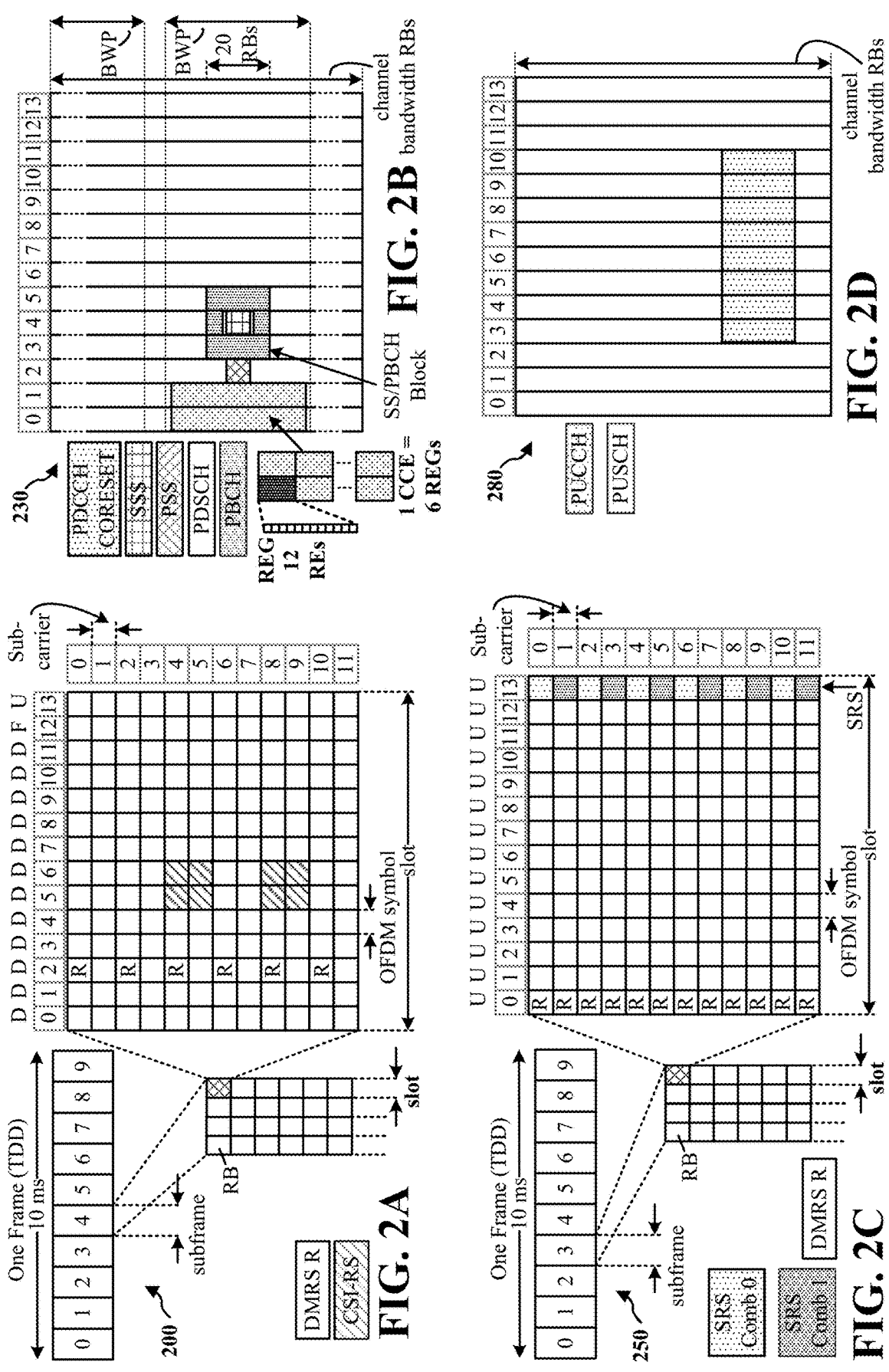
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| $\mu$ | SCS $\Delta f = 2^{\mu} \cdot 15[\text{kHz}]$ | Cyclic prefix |
| 0 | 15 | Normal |
| 1 | 30 | Normal |
| 2 | 60 | Normal, Extended |
| 3 | 120 | Normal |

TABLE 1-continued

| | Numerology, SCS, and CP | |
| --- | --- | --- |
| $^\mu\mu$ | SCS<br>$\Delta f = 2^\mu \cdot 15[kHz]$ | Cyclic prefix |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
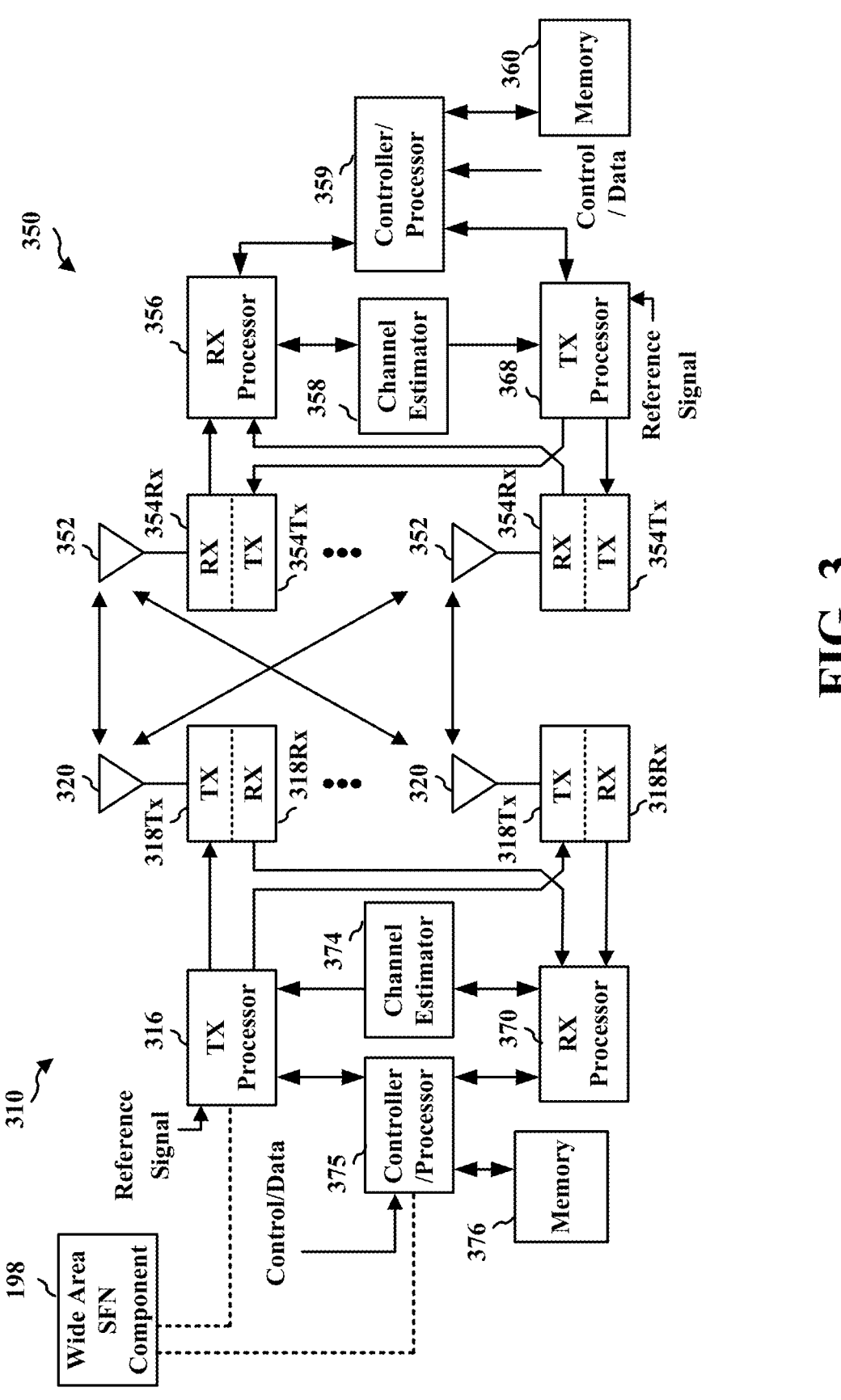
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/ processor 375 is also responsible for error detection using an ACK and/or NACK protocol to support HARQ operations.

At least one of the TX processor 316, the RX processor 370, and the controller/processor 375 may be configured to perform aspects in connection with the wide area SFN component 198 of FIG. 1.

Figure 4B:
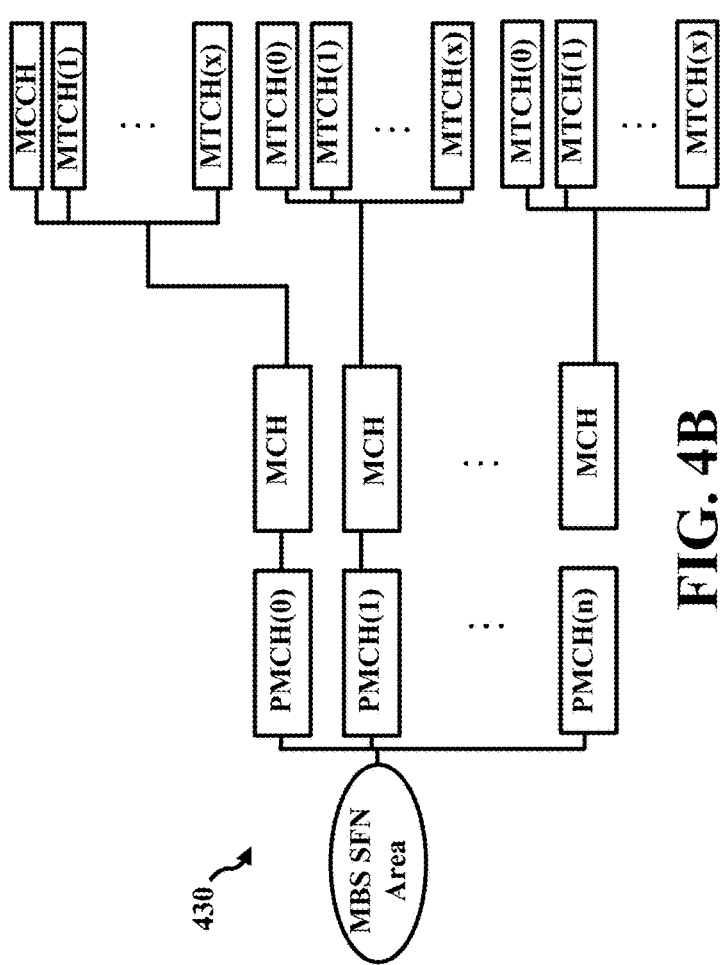
FIG. 4B is a diagram illustrating an example of an MBS channel configuration in an MBS SFN, in accordance with various aspects of the present disclosure.
Figure 4A:
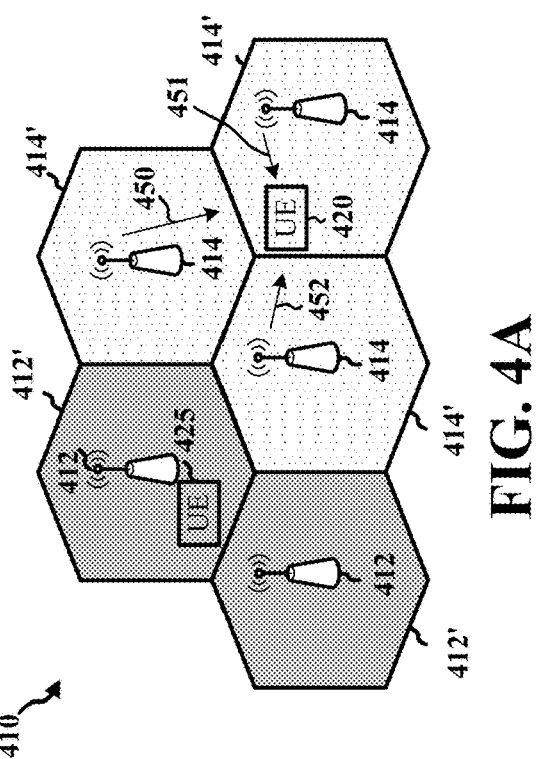
FIG. 4A is a diagram illustrating an example of MBS SFN areas in an access network, in accordance with various aspects of the present disclosure.

FIG. 4A is a diagram 410 illustrating an example of MBS SFN areas in an access network, e.g., such as the network described in connection with FIG. 1. The RAN nodes 412 in cells 412' may form a first MBS SFN area and the RAN nodes 414 in cells 414' may form a second MBS SFN area. The RAN nodes 412, 414 may each be associated with other MBS SFN areas. A cell within an MBS SFN area may be designated a reserved cell. Reserved cells may not provide multicast/broadcast content, but may time-synchronized to the cells 412', 414' and may have restricted power on MBS SFN resources in order to limit interference to the MBS SFN areas. Each RAN node in an MBS SFN area synchronously transmits the same MBS control information and data. For example, the cells (e.g., RAN nodes 414) may transmit transmissions 450, 451, and 452 at the same time (e.g., synchronously) and with the same frequency resources, and the transmissions may include the same control and/or data. The UE 420 may receive the transmissions 450, 451, and 452 as though the transmissions were from a single cell, e.g., based on the synchronous transmission of the same information using the same frequency resources. Each area may support broadcast, multicast, and unicast services. A unicast service is provided for a specific user, e.g., a voice call. A multicast service is a service that may be received by a group of users, e.g., a subscription video service. A broadcast service is a service that may be received by all users, e.g., a news broadcast. Referring to FIG. 4A, the first MBS SFN area may support a first MBS broadcast service, such as by providing a particular news broadcast to UE 425. The second MBS SFN area may support a second MBS broadcast service, such as by providing a different news broadcast to UE 420.

FIG. 4B is a diagram 430 illustrating an example of an MBS channel configuration in an MBS SFN. As shown in FIG. 4B, each MBS SFN area supports one or more physical multicast channels (PMCH) or PDCCH scheduled PDSCH. Each PMCH or PDCCH scheduled PDSCH corresponds to an MCH or DL-SCH. Each MCH or DL-SCH can multiplex a plurality of multicast logical channels. Each MB S SFN area may have one multicast control channel (MCCH). As such, one MCH or DL-SCH may multiplex one or more MCCH and a plurality of multicast traffic channels (MTCHs) and the remaining MCHs or DL-SCH may multiplex a plurality of MTCHs.

A UE can camp on a cell to discover the availability of an MBS service access and a corresponding configuration. Initially, the UE may acquire system information, and based on the system information may acquire an MBS SFN area configuration message on an MCCH. The system information may include an MBS SFN area identifier of each MBS SFN area supported by the cell, information for acquiring the MCCH such as an MCCH repetition period, an MCCH offset, an MCCH modification period, a signaling MCS, subframe allocation information indicating which subframes of the radio frame as indicated by repetition period and offset can transmit MCCH; and/or an MCCH change notification configuration. The MBS SFN area configuration message may indicate a group identity, one or more session identifiers, allocated resources for each PMCH, an MCH scheduling period, or dynamic PDCCH based PDSCH scheduling, etc. The UE may receive control information that indicates, e.g., a starting point for each scheduling period of a PMCH, a channel identifier, and/or a field indicating an end of the MTCH.

An SFN may improve gain by turning inter-cell interference into a useful signal that may assist a UE in receiving downlink data. For example, the SFN transmits the same downlink signal from multiple cells at the same time and using the same frequency resources. Although the signal is transmitted by different cells, a UE receiving the signal may receive the signal as a signal from a single cell, and the transmissions from the other cells may improve the signal received by the UE. SFN transmission involves inter-cell coordination in order to transmit the signal at the same time and using the same frequency resources. In some aspects, the signal that is transmitted in the SFN may include multicast broadcast service (MBS) data. In some aspects, the multiple cells transmitting the MBS as an SFN may correspond to, or be associated with, a same DU (e.g., DU 105). For example, in FIG. 4A, the cells 412' may correspond to a first DU, and the cells 414' may correspond to, or be associated with, a second DU. The SFN may be transparent to the UE. The intra-DU SFN may provide a small area SFN among cells connected to the same DU.

Aspects presented herein enable the synchronization among different DUs to a common timing for the MBS SFN transmission. The aspects enable a wide area SFN, e.g., for MBS. In some aspects, the wide area SFN may be an intra-CU, inter-DU SFN in which cells that are connected to different DUs of a same CU (e.g., CU 106) transmit the MBS as an SFN, e.g., in a synchronous manner using the same frequency resources. In other aspects, the wide area SFN may be an inter-CU, inter-DU SFN in which cells that are connected to different DUs of different CUs transit the MBS as an SFN.

Figure 5:
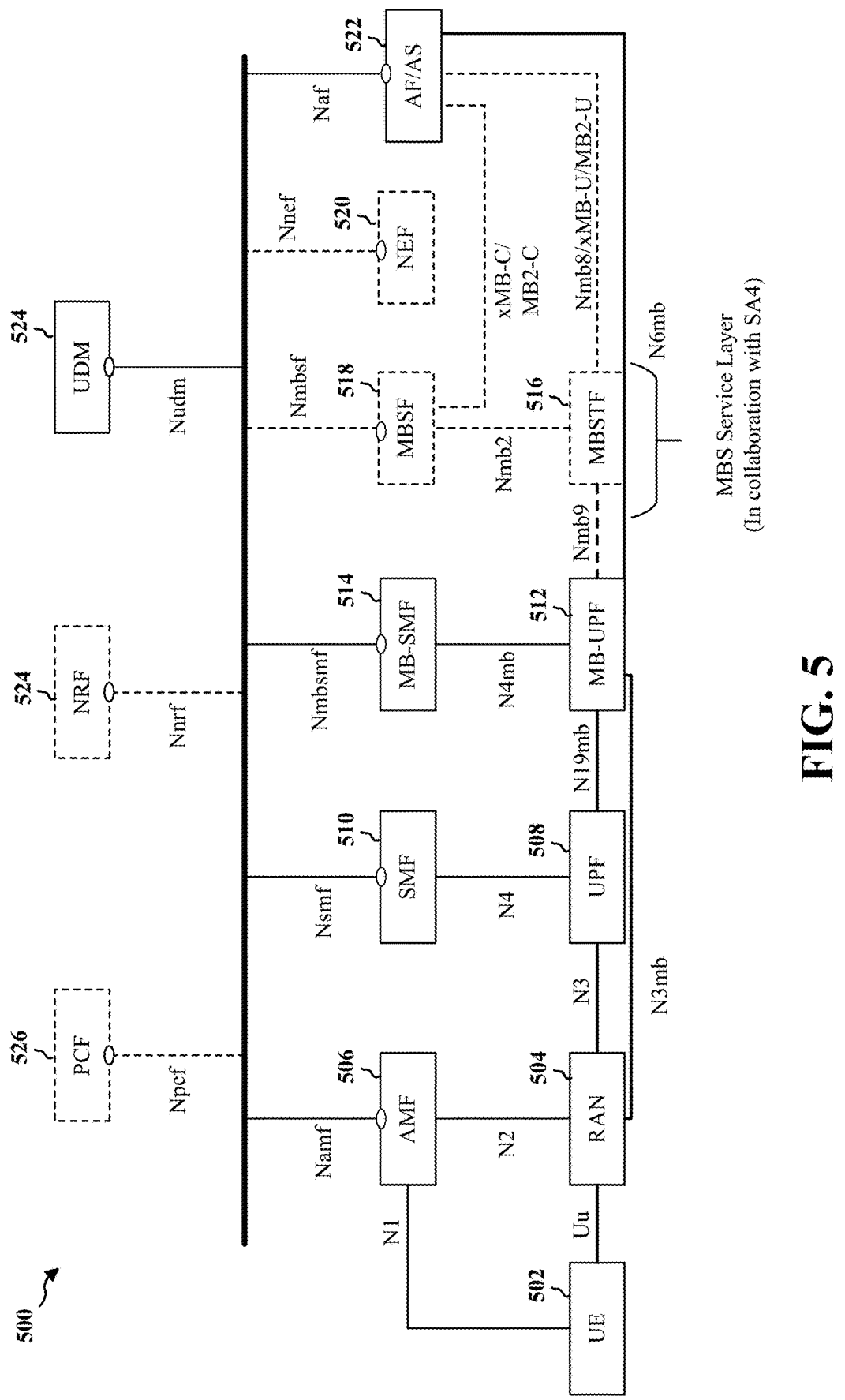
FIG. 5 illustrates an example diagram of an MBS network architecture, in accordance with various aspects of the present disclosure.

FIG. 5 illustrates an architecture 500 for core network functions in accordance with aspects presented herein. In some aspects, the core network may correspond to the core network 190 in FIG. 1. The diagram illustrates an application function (AF) or application server (AS) 522, which is the source that provides the multicast broadcast data for transmission by the network to one or more UEs 502. The AF/AS may provide the data to the multicast broadcast service transfer function (MBSTF) 516, which provides user plane service functionality for MBS services, and provides the user data to the multicast broadcast user plane function (MB-UPF) 512. The multicast broadcast service function (MBSF) 518 provides control plane functionality to configure MBS sessions, and the MBSTF 516 provides user plane functionality. In some aspects, a network may not include an MBSF 518 and MBSTF 516. In such aspects, the AF/AS 522 may provide the user data directly to the MB-UPF 512. From the MB-UPF 512, synchronization may be provided to the different RANs 504. Although a single RAN 504 is illustrated, the network may include multiple RANs 504. The synchronization enables the various RANs 504 to know the timing to use to transmit the MBS data. The MB-SMF 514 controls MBS transport, and may be separate from SMF 510 for unicast (e.g., which may correspond to the SMF 194 in FIG. 1). The MB-UPF 512 provides user plane transport functionality for MBS data via a shared tunnel or unicast delivery, e.g., to non-supporting RAN 504 nodes. Unicast delivery may correspond to individual delivery that may be routed over a unicast UPF 508. The AMF 506 (e.g., which may correspond to the AMF 192 in FIG. 1) transfers MBS signaling between the MB-SMF 514 and the RAN 504. For broadcast, the AMF 506 may provide RAN selection. The RAN 504 may provide support of MBS N3 shared tunnel and PTM/PTP delivery. The UE 502 receives the MBS data over a Uu link with the RAN 504. FIG. 5 also illustrates that the network may include a network exposure function (NEF) 520, a UDM 524 (e.g., which may correspond to the UDM 196 in FIG. 1), a network repository function (NRF) 524, and/or a policy control function (PCF) 526.

Figure 6:
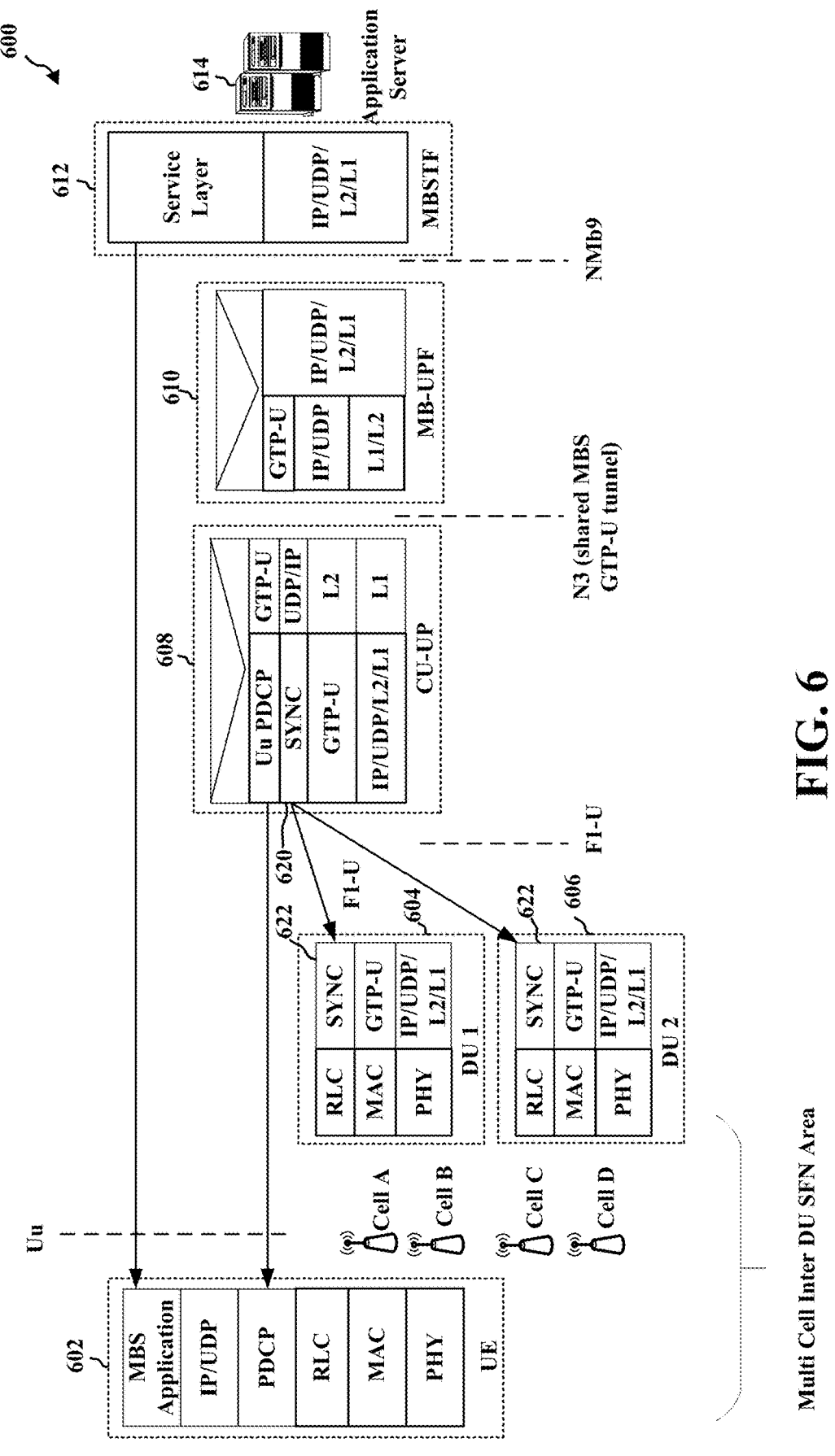
FIG. 6 illustrates an example protocol diagram for an inter-DU and intra-CU wide area SFN, in accordance with various aspects of the present disclosure.

FIG. 6 illustrates an example protocol diagram 600 for an intra-CU-Inter DU wide area SFN. FIG. 6 illustrates the central unit user plane (CU-UP) 608, the MB-UPF 610 (e.g., which may correspond to the MB-UPF 512 in FIG. 5), and the MBSTF 612 (e.g., which may correspond to the MBSTF 516 in FIG. 5), and an application server 614 (e.g., which may correspond to the AF/AS 522 in FIG. 5). The CU in FIG. 6 may correspond to the CU 106 in FIG. 1, and a DU in FIG. 6 may correspond to a DU 105 in FIG. 1. The CU similarly includes a CU-CP that is not illustrated. In some aspects, the central unit control plane (CU-CP) may perform functionality similar to a multicast coordination entity (MCE). As part of performing an MCE functionality, the CU may coordinate scheduling of the MBS across different DUs. The MCE function, e.g., at a CU-CP may include broadcast/multicast service admission control. The MCE function, e.g., at a CU-CP may include any of MBS admission control, MBS radio resource allocation, multicast radio bearer (MRB) establishment, or a counting procedure. The MBS radio resource allocation may include the allocation of time, frequency, modulation, or coding resources for the MBS to multiple DUs that are a part of the SFN area. The CU (e.g., CU-CP) may allocate the radio resources in an SFN area in a semi-static manner, and the reserved resources may be used to schedule the MBS data. The CU may allocate radio resources in a dynamic manner. As an example, when a DU does not receive MBS data in a reserved radio resource, or when the DU determines to schedule higher priority unicast data, the DU may override the MBS radio resources allocated by the CU as the central scheduler. The MRB establishment may include pre-emption based on an allocation retention priority, in some aspects. The counting procedure may include a counter to indicate when to start, stop, and suspend a broadcast session.

As illustrated in FIG. 6, a single CU may have multiple DUs. FIG. 6 illustrates a first DU 604 with multiple associated cells (e.g., Cell A and Cell B)) and a second DU 606 with associated cells Cell C and Cell D. FIG. 6 illustrates an example of the CU/DU split of the protocol stack. The CU 608 and the DUs 604 and 606 may be synchronized to a common reference clock. Although only two DUs are illustrated, the CU may have more than two DUs, and each DU may provide one or more cells. FIG. 6 illustrates a UE 602 having a PHY layer, MAC layer, RLC layer, PDCP layer, IP/User Datagram Protocol (UDP) layer, e.g., as described in connection with FIG. 3.

The data that is sent between the CU 608 and the DUs 604 and 606 for transmission to the UE as an MBS SFN data transmission is synchronized. The data is provided from the network to the UE as a PDU, e.g., based on the PDCP protocol. In some aspects, the synchronization may be provided by a synchronization (SYNC) protocol at the CU-UP (e.g., 620) and the DUs (e.g., 622). The CU, and each DU may be synchronized to a same reference time. The SYNC protocol may add a reference time, e.g., a timestamp that indicates a starting time for the MBS SFN data transmission with respect to a common reference time. For example, if the CU indicates a timestamp of 5 ms to the DUs, the DUs may know that the starting time for the MBS SFN data transmission is T0+5 ms, T0 referring to a common reference time for the DUs and the CU. Therefore, the synchronization protocol enables each DU to know the time at which to transmit the MBS SFN data transmission. The SYNC protocol enables each node to know the common timestamp for a particular packet of the MBS SFN data transmission and to attempt to schedule transmission of the packet at the corresponding time. The common timing information, e.g., timestamp, from the CU enables synchronization of the transmission across different DUs. The SYNC protocol may be a peer to peer SYNC protocol per MRB and may be located at the CU-CU, in some aspects. The SYNC protocol timing information may be used by multiple DUs to send broadcast data over the air interface in a synchronous manner. A timestamp may represent a relative time value with reference to a start time of the synchronization period, which is common for the DUs 604 and 606 and the CU 608. The CU may function as a central scheduling entity for the MBS SFN transmission. For example, a scheduler may determine to transmit a packet of the MBS SFN data transmission at a particular subframe, and the CU may provide the packet to the DUs with a timestamp corresponding to the particular subframe for the packet transmission. The DUs may then schedule the MBS SFN data packet for transmission at the same time, e.g., in a same subframe within a same slot, by the different cells (e.g., Cells A-D) using the same frequency resources. The UE 602 may receive the MBS SFN data transmission as if the transmissions from Cells A-D were coming from a single cell. The combined transmission from multiple cells in an SFN manner may improve reception at the UE.

Figure 7:
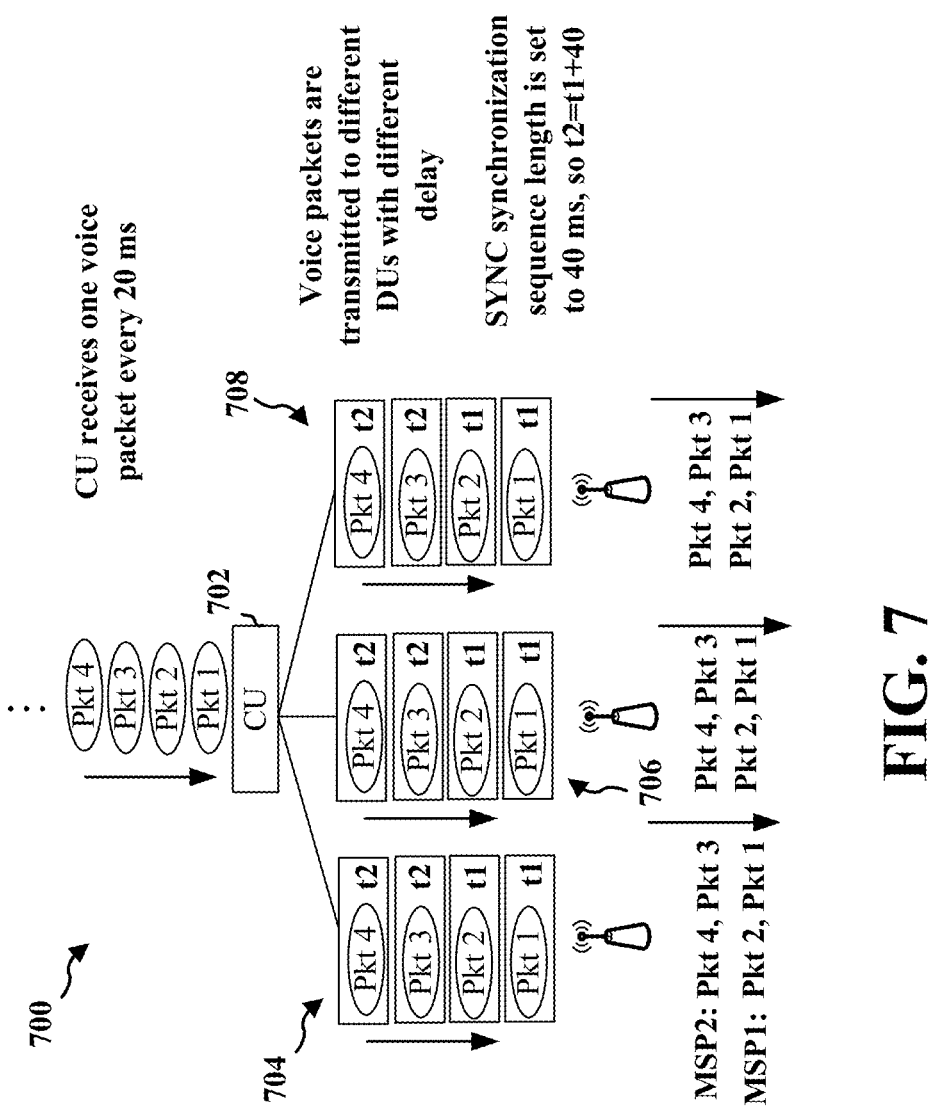
FIG. 7 illustrates example aspects of a synchronization protocol for MBS SFN data transmission, in accordance with various aspects of the present disclosure.

FIG. 7 illustrates example aspects of a SYNC protocol 700 on the F1 interface, e.g., illustrating an example for incoming voice traffic. The SYNC protocol groups incoming packets, e.g., packet 1, packet 2, packet 3, and packet 4 into a synchronization sequence. As illustrated in FIG. 7, the packets from a single CU 702 may be provided to multiple DUs (e.g., DU 704, 706, and 708) for MBS SFN transmission. The synchronization sequence length may be configured, and may be longer than an F1 delay or a delay variation. Each SYNC packet may include control information including, for example, a timestamp and a packet number. The timestamp may be set to the same time in one synchronization sequence. For example, each SYNC PDU may add a timestamp and a sequence number (SN). The packet sequence number in a synchronization sequence may start from 0. An MCH scheduling period (MSP) may be 1 or N times the synchronization sequence length. In each MSP, each DU may make scheduling decisions based on any combination of incoming data of corresponding synchronization sequences, a CU configured MCH resource, or a CU configured rule. Examples of the CU configured rule include an MTCH/MCCH to MCH mapping, a priority rule, etc. FIG. 8 illustrates an example SYNC PDU 800, which may be a SYNC PDU Type 1 format, for a new protocol layer between a PDCP and a GTP-U, e.g., as in the example in FIG. 7. The SYNC PDU 800 includes a time stamp 804, and packet number 806 for the MBS SFN data transmission, for example. In some aspects, the payload fields may be empty for the SYNC PDU, as the corresponding data payload may be provided in a PDCP PDU.

In some aspects, the SYNC protocol may involve a new packet layer (e.g., SYNC layer 620 and SYNC layer 622) between a PDCP layer and the GTP-U layer, e.g., as illustrated in the example in FIG. 6. A PDCP PDU may be carried over a SYNC PDU, e.g., between the CU 608 and the DUs 604 and 606. The SYNC PDU may be carried over the GTP-U, e.g., over the F1 interface, e.g., as illustrated in the example in FIG. 6.

In some aspects, SYNC protocol information elements (IEs) may be added in a RAN container of a GTP-U. There may be a GTP-U tunnel between the CU 608 and the DUs 604 and 606. FIG. 7 illustrates an example of a GTP-U tunnel protocol that may be used for synchronization between the CU 608 and the DUs 604 and 606 for MBS SFN data transmissions. For example, a timestamp IE of the SYNC protocol may be included in downlink (DL) user data (e.g., which may be referred to as DL USER DATA) of an F1-U UP protocol. FIG. 9 illustrates an example of a SYNC IE included in a RAN container of a GTP-U. The SYNC IE is for a data PDU, and includes an indication that it is a SYNC IE, at 902 in FIG. 9. FIG. 9 illustrates an example of information 900 that may be provided to a DU, e.g., including a timestamp 904 for the MBS SFN data packet, as well as a packet number 906 for the MBS SFN data transmission. For packets with a same timestamp, the scheduling sequence may be based on the packet number. In some aspects, a sequence number (e.g., an NR-U sequence number) may also be used for packet loss detection. The CU may indicate the total number of packets of a synchronization sequence to the DU, which may be achieved, e.g., by adding the total number of packets IE to the RAN container or by sending a control PDU without data, such as a SYNC PDU Type 0 format that indicates the total number of packets to the DU(s). In such an example, the packet number IE of the control PDU without data may carry information about the total number of packets.

In some aspects, a new SYNC container may be defined in a GTP-U header to provide the synchronization between the CU and the DUs. The SYNC container may include a frame control part and a frame check sum part of a SYNC PDU. The payload portion of the SYNC PDU may be carried by the GTP-U payload.

Figure 10:
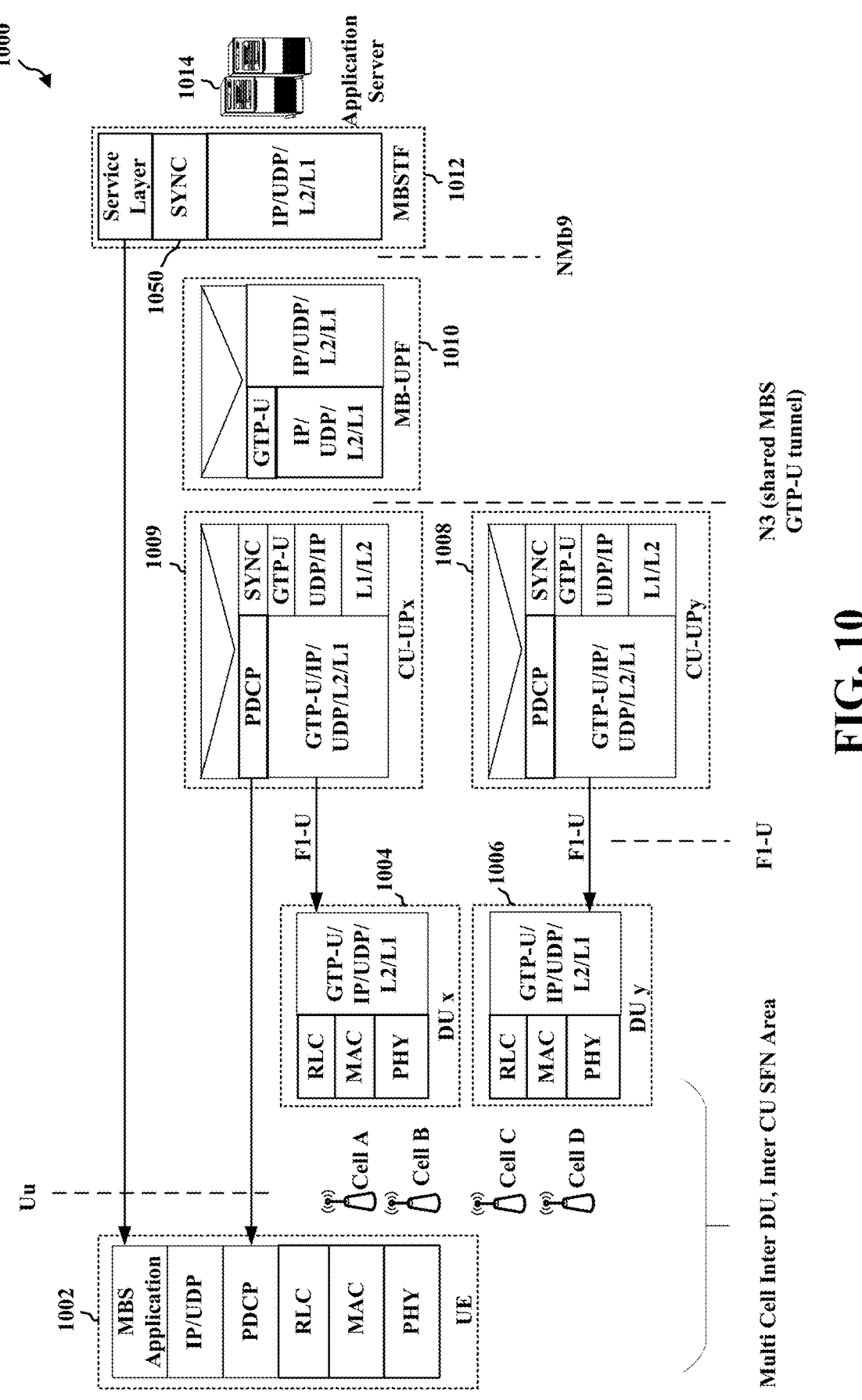
FIG. 10 illustrates an example protocol diagram for an inter-DU and inter-CU wide area SFN, in accordance with various aspects of the present disclosure.

In some aspects, the wide area SFN may include multiple CUs, and may correspond to an inter CU-inter DU wide area SFN. FIG. 10 illustrates an example protocol diagram 1000 for an inter-CU-inter DU wide area SFN. A CU in FIG. 10 may correspond to the CU 106 in FIG. 1, and a DU in FIG. 10 may correspond to a DU 105 in FIG. 1. FIG. 10 illustrates the MB-UPF 1010 (e.g., which may correspond to the MB-UPF 512 in FIG. 5), and the MBSTF 1012 (e.g., which may correspond to the MBSTF 516 in FIG. 5), and an application server 1014 (e.g., which may correspond to the AF/AS 522 in FIG. 5). FIG. 10 illustrates a UE 1002 having protocol layers similar to the UE 602 in FIG. 6, and illustrates that each DU may provide the MBS SFN data to be transmitted by one or more cells, e.g., including cells A-D. In contrast to FIG. 6, FIG. 10 illustrates multiple CUs, each CU providing the MBS SFN data packets and synchronization information to separate DUs. For example, the CU-UPy 1008 provides the MBS data packet(s) for SFN transmission to the DUy 1006 for transmission via cells C and D. The CU-UPx 1009 provides the MBS data packet(s) for SFN transmission to the DUx 1004 for transmission via cells A and B in synchronization with the cells C and D of the DUy 1006. The cells transmit the MBS packet(s) at the same time and using the same frequency resources, so that the UE 1002 may receive the separate transmissions as though a single transmission from a single cell. Although a single DU is illustrated for each CU, each CU may provide the MBS SFN data and synchronization information to one or more DUs. As well, although two CUs are illustrated in the example in FIG. 10, the MBS SFN data packets may be distributed by any number of CUs, e.g., including more than two CUs.

Two layers of a SYNC protocol may be used for the inter-CU inter-DU wide area SFN, e.g., a CU-DU SYNC protocol and a CN-RAN SYNC protocol. The CU-DU SYNC protocol may include any of the aspects described in connection with the CU-DU SYNC protocol described in connection with any of FIGS. 6-9. The example SYNC protocol may include a core network (CN)-RAN SYNC protocol with a SYNC protocol layer between a CU (e.g., 1008 or 1009) and the MBSTF 1012 (e.g., as illustrated at 1050) or the MB-UPF 1010. In some aspects, the CN-RAN SYNC protocol may include aspects of an eMBMS SYNC protocol. Thus, the CUs may be synchronized, e.g., with the MBSTF or the MB-UPF, and the DUs may be synchronized with their respective CU, in order to provide synchronous transmission of the MBS data from the cells of different DUs, the cells being associated with different CUs.

Similar to SYNC over F1, the CN-RAN synchronization protocol can also be supported by adding SYNC information into a RAN container of GTP-U, e.g., as described in connection with FIG. 10. For the CN-RAN synchronization protocol, the RAN container may be different or may be a new container. The CU-DU synchronization information may be generated based on CN-RAN SYNC information. If a PDCP is not used for the SYNC protocol, the SYNC protocol may be extended between the CN and DUs directly.

An MBS coordination entity (MCE) may be provided (e.g., as a central scheduling entity for the MBS SFN data transmission). Interfaces may be provided for wide area SFN, e.g., including an interface between the core network and the central scheduling entity that performs the MCE functionality (e.g., similar to an M3 interface) and/or an interface between the central scheduling entity performing the MCE functionality and the RAN node (e.g., similar to an M2 interface). In some aspects, one CU-CP may perform the role of the MCE. As part of performing an MCE functionality, the CU may coordinate scheduling of the MBS between the CUs and across different DUs. The MCE function, e.g., at a CU-CP may include broadcast/multicast service admission control. The MCE function, e.g., at a CU-CP may include any of MBS admission control, MBS radio resource allocation, MRB establishment, or a counting procedure. The MBS radio resource allocation may include the allocation of time, frequency, modulation, or coding resources for the MBS, and may provide the allocation to one or more CUs and to multiple DUs that are a part of the SFN area. The CU performing the MCE functionality may allocate the radio resources in an SFN area in a semi-static manner, and the reserved resources may be used to schedule the MBS data. The CU may allocate radio resources in a dynamic manner. As an example, when a DU does not receive MBS data in a reserved radio resource, or when the DU determines to schedule higher priority unicast data, the DU may override the MBS radio resources allocated by the CU as the central scheduler. The MRB establishment may include pre-emption based on an allocation retention priority, in some aspects. The counting procedure may include a counter to indicate when to start, stop, and suspend a broadcast session.

In some aspects, the inter-CU SFN may add additional complexity at the network side. Alternatively, an inter-CU SFN may be supported based on CU resilience. For example, one DU may connect to multiple CUs. One of the CUs may perform the role of the MCE.

For the CN-RAN SYNC protocol, which provides a synchronization between the network and multiple CUs, the GTP-U tunnel between RAN (e.g., in some aspects a gNB-CU) and the CN (e.g., in some aspects an MB-UPF) is at an MBS session level. Each MBS session has one or more MBS flows. The SYNC protocol may be used for an MBS session level and/or an MBS flow level.

For the CU-DU SYNC protocol, which provides synchronization between the CU and each DU, the F1-U tunnel is per MBS radio bearer (MRB). Thus, the CU-DU SYNC protocol may be used per MRB. The timestamp may be based on, e.g., inherited from, the CN-RAN SYNC protocol. In some aspects, the packet number may be regenerated based on packet number in CN-RAN SYNC. As an example, an MBS session may have three MBS flows: f1, f2, f3. The first and second flows, e.g., f1 and f2 may be mapped to a first MRB (e.g., MRB1) and the third flow f3 may be mapped to a second MRB (e.g., MRB2). The packet number for the MRB1 may be generated based on the sequence number for f1 and f2. For example: in an MBS session level SYNC case, the CN may send the packets to the RAN in one synchronization sequence as: 1 (f3_1), 2 (f1_1), 3 (f2_1), 4 (f2_2). The packet numbers for the MRB1 may be: 1 (f1_1), 2 (f2_1), 3 (f2_2), and the packet numbers for MRB2 may be: 1 (f3_1).

The CU(s) and DUs maintain a common time reference, e.g., in order to transmit synchronous MBS data transmissions. The common time reference enables the CU-CP and the DUs to have a common MCCH modification period and modification boundary. Each of the CU-CP and DUs may maintain a counter for an MCCH modification period, and the counter may be incremented after each modification period. The reference, or trigger, for starting the counter may be a start of a first MCCH modification period. The counter may enable the CU-CP to inform the DUs about the MCCH modification period in which the MCCH update is to occur.

To realize a larger area (e.g., wide area) SFN using an extended cyclic prefix (e.g., as described in connection with FIGS. 2A-2D, for MCCH PDCCH and PDSCH, multiple MCCH may be supported. Example aspects of an MCCH are described in connection with FIG. 4B. An extended cyclic prefix (ECP), e.g., in contrast to a normal cyclic prefix (NCP), may be based on an MCCH for UEs that are capable of receiving an ECP based SFN transmission. In some aspects, MBS SFN information may be added to the MCCH, e.g., based on whether the SFN is a smaller area SFN or a large area SFN. Each SFN area may be associated with a corresponding MCCH, in some aspects. The MCCH may be either ECP or NCP based. An ECP based MBS SFN area configuration may be provided as part of a first type of MCCH without a wide area SFN configuration or may be provided as part of a second type of MCCH that includes a wide area SFN configuration. In some aspects, there may be one MCCH for an SFN area, e.g., a NCP based MCCH that can be received by UEs that do not support ECP. For example, an ECP based MBS SFN area configuration may be provided by an NCP MCCH. In some aspects, there may be multiple MCCHs for an SFN area, e.g., a NCP based MCCH and an ECP based MCCH. In some aspects, there may be a single ECP based MCCH for each MBS SFN area. An ECP based MBS SFN area configuration may be provided by the ECP based MCCH.

Figure 12:
FIG. 12 is a diagram illustrating an example of a hardware implementation for an example apparatus, in accordance with various aspects of the present disclosure.

FIG. 11A is a flowchart 1100 of a method of wireless communication. The method may be performed by a component of a base station (e.g., the base station 102/180). For example, the method may be performed by a DU (e.g., DU 105, 604, 606, 1004, 1006, 704, 706, 708, 1530, 1630) or network node 1202. FIG. 12 illustrates an example of a network node 1202 apparatus that may perform the method in the flowchart 1100 in FIG. 11A. The method may enable a wide area MBS SFN by providing synchronization between a DU and a CU (e.g., CU 106, 608, 702, 1008, 1009, 1510, 1610). The MBS SFN area may be an intra-CU, inter-DU SFN area, and the method of flowchart 1100 may enable multiple DUs to synchronize with a CU for transmission of MBS SFN data packets in a synchronous manner across the multiple DUs. The MBS SFN area may be an inter-CU, inter-DU SFN area, and the method of flowchart 1100 may enable multiple CUs to synchronize with the network and multiple DUs to synchronize with a CU for transmission of MBS SFN data packets in a synchronous manner across the multiple DUs.

At 1102, the DU receives synchronization timing information for an MBS SFN data transmission in a synchronous manner with at least one additional DU. In some aspects, the at least one additional DU may be associated with the same CU. For example, the MBS SFN may be for an intra-CU, inter-DU wide area SFN, e.g., as described in connection with FIG. 6. In some aspects, the at least one additional DU may be associated with a different CU than the DU. For example, the MBS SFN may be for an inter-CU, inter-DU wide area SFN, e.g., as described in connection with FIG. 10. In some aspects, the reception of the synchronization timing information may be performed, e.g., by the synchronization component 1240 of the network node 1202 in FIG. 12.

At 1104, the DU transmits the MBS SFN data transmission with a timing based on the synchronization timing information. The transmission may be via one or more RAN nodes, e.g., and may be via one or more cells at each RAN node. In some aspects, transmission of the MBS SFN data transmission may be performed, e.g., by the MBS SFN component 1242 of the network node 1202 in FIG. 12.

In some aspects, the synchronization timing information for the MBS SFN data transmission may be included in a SYNC PDU from a CU. The SYNC PDU may correspond to a synchronization PDU comprised in a GTP-U over an F1 interface, e.g., as described in connection with the example in FIG. 8. The synchronization protocol may group incoming packets into a synchronization sequence, e.g., as described in connection with FIG. 7. Each packet may include a timestamp and a packet number.

In some aspects, the synchronization timing information for the MBS SFN data transmission may be included in a synchronization IE comprised in a UP container of an F1-U interface with a CU, e.g., as described in connection with the example in FIG. 9. The synchronization timing information may include a timestamp of a synchronization protocol added to downlink user data of an F1-U UP protocol. The synchronization IE may further include a packet number associated with the time stamp.

In some aspects, the synchronization timing information for the MBS SFN data transmission may be included in a synchronization container in a GTP-U header from a CU. The synchronization container may further include a frame control portion and a frame check portion of a synchronization PDU, a payload of the synchronization PDU being carried by a GTP-U payload.

FIG. 11B is a flowchart 1150 of a method of wireless communication. The method may be performed by a component of a base station (e.g., the base station 102/180). For example, the method may be performed by a DU (e.g., DU 105, 604, 606, 1004, 1006, 1530, network node 1202). FIG. 12 illustrates an example of a network node 1202 or apparatus that may perform the method in the flowchart 1150 in FIG. 11B. The method may enable a wide area MBS SFN by providing synchronization between a DU and a CU (e.g., CU 106, 608, 1008, 1009, 1510). The MBS SFN area may be an intra-CU, inter-DU SFN area, and the method of flowchart 1150 may enable multiple DUs to synchronize with a CU for transmission of MBS SFN data packets in a synchronous manner across the multiple DUs. The MBS SFN area may be an inter-CU, inter-DU SFN area, and the method of flowchart 1150 may enable multiple CUs to synchronize with the network and multiple DUs to synchronize with a CU for transmission of MBS SFN data packets in a synchronous manner across the multiple DUs.

At 1102, the DU receives synchronization timing information for an MBS SFN data transmission in a synchronous manner with at least one additional DU. In some aspects, the at least one additional DU may be associated with the same CU. For example, the MBS SFN may be for an intra-CU, inter-DU wide area SFN, e.g., as described in connection with FIG. 6. In some aspects, the at least one additional DU may be associated with a different CU than the DU. For example, the MBS SFN may be for an inter-CU, inter-DU wide area SFN, e.g., as described in connection with FIG. 10. In some aspects, the reception of the synchronization timing information may be performed, e.g., by the synchronization component 1240 of the network node 1202 in FIG. 12.

At 1104, the DU transmits the MBS SFN data transmission with a timing based on the synchronization timing information. The transmission may be via one or more RAN nodes, e.g., and may be via one or more cells at each RAN node. In some aspects, transmission of the MBS SFN data transmission may be performed, e.g., by the MBS SFN component 1242 of the network node 1202 in FIG. 12.

In some aspects, the synchronization timing information for the MBS SFN data transmission may be included in a SYNC PDU from a CU. The SYNC PDU may correspond to a synchronization PDU comprised in a GTP-U over an F1 interface, e.g., as described in connection with the example in FIG. 8. The synchronization protocol may group incoming packets into a synchronization sequence, e.g., as described in connection with FIG. 7. Each packet may include a timestamp and a packet number.

In some aspects, the synchronization timing information for the MBS SFN data transmission may be included in a synchronization IE comprised in a UP container of an F1-U interface with a CU, e.g., as described in connection with the example in FIG. 9. The synchronization timing information may include a timestamp of a synchronization protocol added to downlink user data of an F1-U UP protocol. The synchronization IE may further include a packet number associated with the time stamp.

In some aspects, the synchronization timing information for the MBS SFN data transmission may be included in a synchronization container in a GTP-U header from a CU. The synchronization container may further include a frame control portion and a frame check portion of a synchronization PDU, a payload of the synchronization PDU being carried by a GTP-U payload.

In some aspects, as shown at 1106, the DU may maintain a MCCH modification period and MCCH modification boundary in common with a CU. An MCCH for an MBS SFN area served by the DU may be based on an extended cyclic prefix. The maintenance may be performed, e.g., by the MCCH component 1244 of the network node 1202 in FIG. 12, in some aspects.

FIG. 12 is a diagram 1200 illustrating an example of a hardware implementation for a network node 1202. The network node 1202 may be a base station, a component of a base station, or may implement base station functionality. The apparatus may be a DU (e.g., DU 105, 604, 606, 1004, 1006, 704, 706, 708, 1530), a component of a DU, or may implement DU functionality. In some aspects, the network node 1202 may include a baseband unit 1204. The baseband unit 1204 may communicate through a transceiver 1222 with the UE(s) 104 and/or with a CU (e.g., CU 106, 608, 702, 1008, 1009, 1510). The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of DU. In some aspects, the network node 1202 may include the memory 376 and/or at least one of the TX processor 316, the RX processor 370, and the controller/processor 375.

The communication manager 1232 includes a synchronization component 1240 that is configured to receive synchronization timing information for an MBS SFN data transmission in a synchronous manner with at least one additional DU, e.g., as described in connection with 1102 in FIG. 11A or 11B. The communication manager 1232 further includes an MBS SFN component 1242 that is configured to transmit the MBS SFN data transmission with a timing based on the synchronization timing information, e.g., as described in connection with 1104 in FIG. 11A or 11B. The communication manager 1232 further includes an MCCH component 1244 that is configured to maintain a MCCH modification period and MCCH modification boundary in common with a CU, e.g., as described in connection with 1106 in FIG. 11A or 11B.

The apparatus may include additional components that perform each of the blocks of the algorithm in the flowchart of FIG. 11A or FIG. 11B. As such, each block in the flowchart of FIG. 11A or FIG. 11B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the network node 1202 may include a variety of components configured for various functions. In one configuration, the network node 1202, and in particular the baseband unit 1204, includes means for receiving synchronization timing information for an MBS SFN data transmission in a synchronous manner with at least one additional DU; and means for transmitting the MBS SFN data transmission with a timing based on the synchronization timing information. The network node 1202 may further include means for maintaining a MCCH modification period and MCCH modification boundary in common with a CU. The means may be one or more of the components of the network node 1202 configured to perform the functions recited by the means. As described supra, the network node 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 14:
FIG. 14 is a diagram illustrating an example of a hardware implementation for an example apparatus, in accordance with various aspects of the present disclosure.

FIG. 13A is a flowchart 1300 of a method of wireless communication. The method may be performed by a component of a network or of a base station (e.g., the base station 102/180). For example, the method may be performed by a CU (e.g., CU 106, 608, 702, 1008, 1009, 1510, 1610). FIG. 14 illustrates an example of an network node 1402 that may be configured to perform the method in the flowchart 1300 in FIG. 13A. The method may enable a wide area MBS SFN by providing synchronization between a CU and multiple DUs (e.g., DU 105, 604, 606, 1004, 1006, 704, 706, 708, 1530, 1630) and/or between multiple CUs. The MBS SFN area may be an intra-CU, inter-DU SFN area, and the method of flowchart 1300 may enable multiple DUs to synchronize with a CU for transmission of MBS SFN data packets in a synchronous manner across the multiple DUs. The MBS SFN area may be an inter-CU, inter-DU SFN area, and the method of flowchart 1300 may enable multiple CUs to synchronize with the network and multiple DUs to synchronize with a CU for transmission of MBS SFN data packets in a synchronous manner across the multiple DUs.

At 1308, the CU transmits synchronization timing information for an MBS SFN data transmission in a synchronous manner to multiple DUs. In some aspects, the MBS SFN may be an intra-CU, inter-DU wide area SFN, e.g., as described in connection with FIG. 6. In some aspects, the MBS SFN may be an inter-CU, inter-DU wide area SFN, e.g., as described in connection with FIG. 10. In some aspects, the transmission of the synchronization timing information may be performed, e.g., by the synchronization component 1440 of the network node 1402 in FIG. 14.

At 1310, the CU transmits the MBS SFN data transmission to the multiple DUs for synchronous transmission to one or more UEs. The transmission may be provided to the multiple DUs for transmission to UE(s) via one or more RAN nodes, e.g., via one or more cells at each RAN node. In some aspects, transmission of the MBS SFN data transmission may be performed, e.g., by the MBS SFN component 1442 of the network node 1402 in FIG. 14.

The synchronization timing information for the MBS SFN data transmission may be included in a SYNC PDU to the multiple DUs. The SYNC PDU may correspond to a synchronization PDU comprised in a GTP-U over an F1 interface, e.g., as described in connection with the example in FIG. 8. In some aspects, a synchronization protocol may group incoming packets into a synchronization sequence, e.g., as described in connection with FIG. 7. Each packet may include a timestamp and a packet number.

In some aspects, the synchronization timing information for the MBS SFN data transmission may be included in a synchronization IE comprised in a UP container of an F1-U interface with the multiple DUs, e.g., as described in connection with the example in FIG. 9. The synchronization timing information may include a timestamp of a synchronization protocol added to downlink user data of an F1-U UP protocol. The synchronization IE may further include a packet number associated with the time stamp.

In some aspects, the synchronization timing information for the MBS SFN data transmission may be included in a synchronization container in a GTP-U header to the multiple DUs. The synchronization container may further include a frame control portion and a frame check portion of a synchronization PDU, a payload of the synchronization PDU being carried by a GTP-U payload.

FIG. 13B illustrate a flowchart 1350 of a method of wireless communication that may include 1308 and 1310 from FIG. 13A. As illustrated at 1302, the CU (e.g., CU 106, 608, 702, 1008, 1009, 1510, 1610) may receive first synchronization timing information from at least one of an MBSTF or an MB-UPF, the synchronization timing information transmitted to the multiple DUs (e.g., DU 105, 604, 606, 1004, 1006, 704, 706, 708, 1530, 1630) being second synchronization timing information that is based on the first synchronization timing information from the at least one of the MBSTF or the MB-UPF. The reception may be performed, e.g., by the synchronization component 1440 of the network node 1402. The first synchronization timing information may be provided for an MRB. For example, the synchronization timing information may be provided per MRB.

As illustrated at 1304, in some aspects, the CU may perform MBS coordination with at least one additional CU. The MBS coordination includes at least one of: MBS admission control, MBS service radio resource allocation, MRB establishment, or a counting procedure for staring, stopping, or suspending an MBS session. The MBS coordination may be performed, e.g., by the coordination component 1446 of the network node 1402 in FIG. 14. As illustrated at 1306, in some aspects, the CU may receive MBS coordination from at least one additional CU, wherein the MBS coordination includes at least one of MBS admission control, MBS service radio resource allocation, MRB establishment, or a counting procedure for staring, stopping, or suspending an MBS session. The reception of the MBS coordination may be performed, e.g., by the coordination component 1446 of the network node 1402 in FIG. 14.

The first synchronization timing information, which is received at 1302, may be received over a GTP-U tunnel between a core network and the CU for an MBS session. In some aspects, the CU may synchronize the MBS session or an MBS flow based on the synchronization timing information, e.g., as shown at 1307.

As illustrated at 1312, the CU may maintain an MCCH modification period and MCCH modification boundary in common with the multiple DUs. The maintenance may be performed, e.g., by the MCCH component 1444 of the network node 1402 in FIG. 14. An MCCH for an MBS SFN area served by the CU and the multiple DUs may be based on an extended cyclic prefix.

FIG. 14 is a diagram 1400 illustrating an example of a hardware implementation for an network node 1402. The network node 1402 may be a network component, a base station, a component of a base station, or may implement base station functionality. The apparatus may be a CU (e.g., CU 106, 608, 702, 1008, 1009, 1510, 1610), a component of a CU, or may implement CU functionality. In some aspects, the network node 1402 may include a baseband unit 1404. The baseband unit 1404 may communicate through a transceiver 1422 with the MB-UPF 610 or the MBSTF 612 and with the DUs 105 to transmit communication to the UE(s) 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a synchronization component 1440 that is configured to transmit synchronization timing information for an MBS SFN data transmission in a synchronous manner to multiple DUs, e.g., as described in connection with 1308 in FIG. 13A or 13B. In some aspects, the synchronization component 1440 may be configured to receive first synchronization timing information from at least one of an MBSTF or an MB-UPF, e.g., as described in connection with 1302 in FIG. 13B. The synchronization timing information transmitted to the multiple DUs may be second synchronization timing information that is based on the first synchronization timing information from the at least one of the MBSTF or the MB-UPF. The communication manager 1432 further includes an MBS SFN component 1442 that is configured to transmit the MBS SFN data transmission to the multiple DUs for synchronous transmission to one or more UEs, e.g., as described in connection with 1310 in FIG. 13A or 13B. The communication manager 1432 further includes an MCCH component 1444 that is configured to maintain a MCCH modification period and MCCH modification boundary in common with the multiple DUs, e.g., as described in connection with 1312 in FIG. 13B. The network node 1402 may further include a coordination component 1446 configured to perform MBS coordination with at least one additional CU and/or to receive MBS coordination from an additional CU, e.g., as described in connection with 1304 and/or 1306 in FIG. 13B.

The apparatus may include additional components that perform each of the blocks of the algorithm in the flowcharts of FIGS. 13A and 13B. As such, each block in the flowcharts of FIGS. 13A and 13B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the network node 1402 may include a variety of components configured for various functions. In one configuration, the network node 1402, and in particular the baseband unit 1404, includes means for transmitting synchronization timing information for a MBS SFN data transmission in a synchronous manner to multiple DUs; and means for transmitting the MBS SFN data transmission to the multiple DUs for synchronous transmission to one or more UEs. The network node 1402 may further include means for receiving first synchronization timing information from at least one of an MBSTF or an MB-UPF, the synchronization timing information transmitted to the multiple DUs being second synchronization timing information that is based on the first synchronization timing information from the at least one of the MBSTF or the MB-UPF. The network node 1402 may further include means for performing MBS coordination with at least one additional CU. The network node 1402 may further include means for receiving MBS coordination from at least one additional CU. The means may be one or more of the components of the network node 1402 configured to perform the functions recited by the means. As described supra, the network node 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 15:
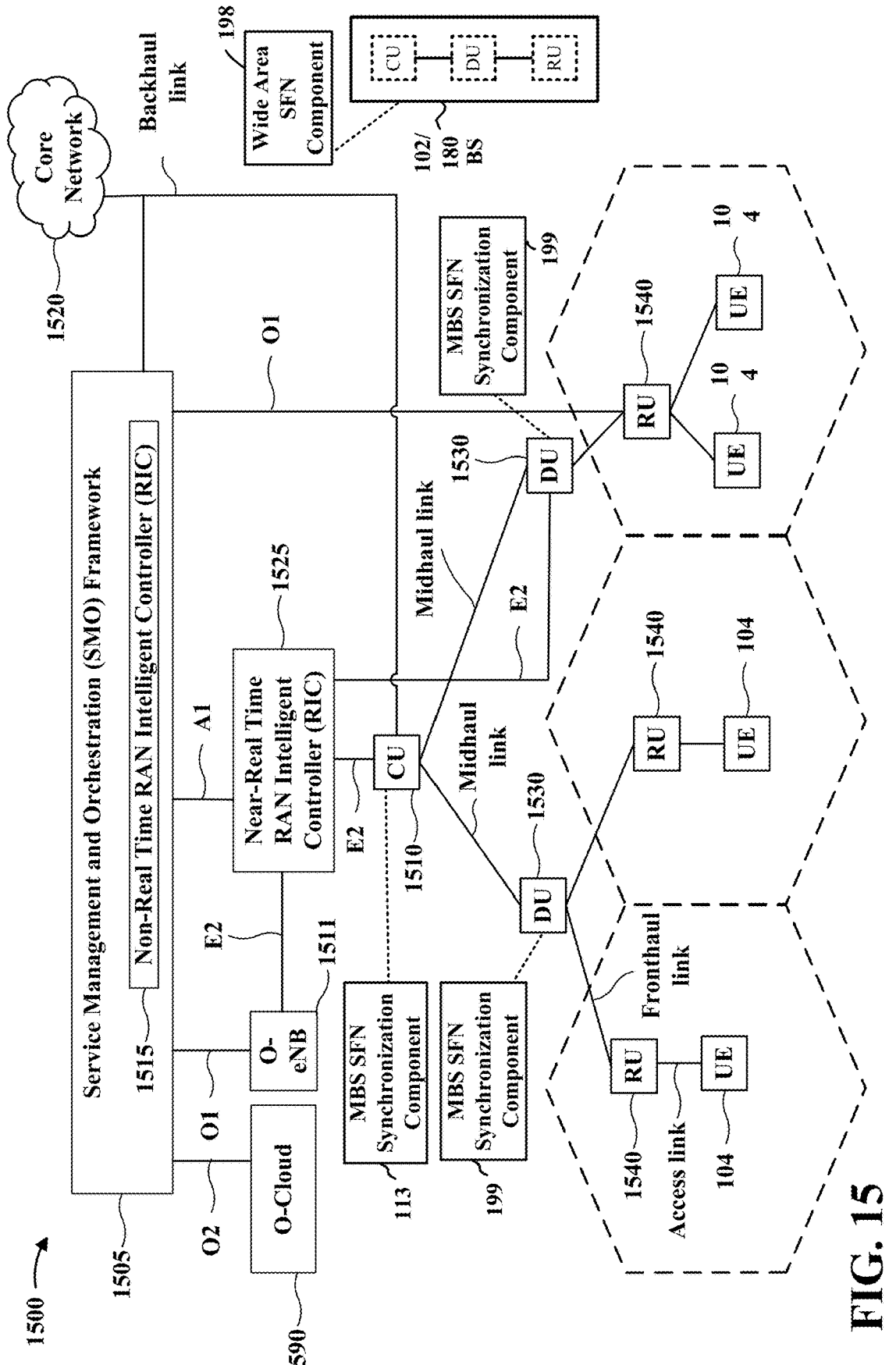
FIG. 15 is a diagram illustrating an example wireless communication system and an access network, including a disaggregated base station architecture.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station. FIG. 15 is a diagram 1500 illustrating an example of a wireless communication system and an access network, similar to FIG. 1. The illustrated system in FIG. 15 includes an example disaggregated base station architecture.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture may include one or more central units (CUs) 1510 that can communicate directly with a core network 1520 via a backhaul link, or indirectly with the core network 1520 through one or more disaggregated base station units (such as a Near-Real Time (Near-RT) RAN Intelligent Controller (RIC) 1525 via an E2 link, or a Non-Real Time (Non-RT) RIC 1515 associated with a Service Management and Orchestration (SMO) Framework 1505, or both). A CU 1510 may communicate with one or more distributed units (DUs) 1530 via respective midhaul links, such as an F1 interface. The DUs 1530 may communicate with one or more radio units (RUs) 1540 via respective fronthaul links. The RUs 1540 may communicate with respective UEs 104 via one or more radio frequency (RF) access links. In some implementations, the UE 104 may be simultaneously served by multiple RUs 1540.

Each of the units, i.e., the CUs 1510, the DUs 1530, the RUs 1540, as well as the Near-RT RICs 1525, the Non-RT RICs 1515 and the SMO Framework 1505, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1510 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1510. The CU 1510 may be configured to handle user plane functionality (i.e., Central Unit-User Plane (CU-UP)), control plane functionality (i.e., Central Unit-Control Plane (CU-CP)), or a combination thereof. In some implementations, the CU 1510 can be logically split into one or more CU-UP units and one or more CU-CP units. The CU-UP unit can communicate bidirectionally with the CU-CP unit via an interface, such as the E1 interface when implemented in an O-RAN configuration. The CU 1510 can be implemented to communicate with the DU 1530, as necessary, for network control and signaling.

The DU 1530 may correspond to a logical unit that includes one or more base station functions to control the operation of one or more RUs 1540. In some aspects, the DU 1530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1530 may further host one or more low PHY layers. Each layer (or module) can be implemented with an interface configured to communicate signals with other layers (and modules) hosted by the DU 1530, or with the control functions hosted by the CU 1510.

Lower-layer functionality can be implemented by one or more RUs 1540. In some deployments, an RU 1540, controlled by a DU 1530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1540 can be implemented to handle over the air (OTA) communication with one or more UEs 104. In some implementations, real-time and non-real-time aspects of control and user plane communication with the RU(s) 1540 can be controlled by the corresponding DU 1530. In some scenarios, this configuration can enable the DU(s) 1530 and the CU 1510 to be implemented in a cloud-based RAN architecture, such as a vRAN architecture.

The SMO Framework 1505 may be configured to support RAN deployment and provisioning of non-virtualized and virtualized network elements. For non-virtualized network elements, the SMO Framework 1505 may be configured to support the deployment of dedicated physical resources for RAN coverage requirements which may be managed via an operations and maintenance interface (such as an O1 interface). For virtualized network elements, the SMO Framework 1505 may be configured to interact with a cloud computing platform (such as an open cloud (O-Cloud) 1590) to perform network element life cycle management (such as to instantiate virtualized network elements) via a cloud computing platform interface (such as an O2 interface). Such virtualized network elements can include, but are not limited to, CUs 1510, DUs 1530, RUs 1540 and Near-RT RICs 1525. In some implementations, the SMO Framework 1505 can communicate with a hardware aspect of a 4G RAN, such as an open eNB (O-eNB) 1511, via an O1 interface. Additionally, in some implementations, the SMO Framework 1505 can communicate directly with one or more RUs 1540 via an O1 interface. The SMO Framework 1505 also may include a Non-RT RIC 1515 configured to support functionality of the SMO Framework 1505.

The Non-RT RIC 1515 may be configured to include a logical function that enables non-real-time control and optimization of RAN elements and resources, artificial intelligence/machine learning (AI/ML) workflows including model training and updates, or policy-based guidance of applications/features in the Near-RT RIC 1525. The Non-RT RIC 1515 may be coupled to or communicate with (such as via an A1 interface) the Near-RT RIC 1525. The Near-RT RIC 1525 may be configured to include a logical function that enables near-real-time control and optimization of RAN elements and resources via data collection and actions over an interface (such as via an E2 interface) connecting one or more CUs 1510, one or more DUs 1530, or both, as well as an O-eNB, with the Near-RT RIC 1525.

In some implementations, to generate AI/ML models to be deployed in the Near-RT RIC 1525, the Non-RT RIC 1515 may receive parameters or external enrichment information from external servers. Such information may be utilized by the Near-RT RIC 1525 and may be received at the SMO Framework 1505 or the Non-RT RIC 1515 from non-network data sources or from network functions. In some examples, the Non-RT RIC 1515 or the Near-RT RIC 1525 may be configured to tune RAN behavior or performance. For example, the Non-RT RIC 1515 may monitor long-term trends and patterns for performance and employ AI/ML models to perform corrective actions through the SMO Framework 1505 (such as reconfiguration via O1) or via creation of RAN management policies (such as A1 policies). At least one of the CU 1510, the DU 1530, and the RU 1540 may be referred to as a base station 102. Accordingly, a base station 102 or 180 may include one or more of the CU 1510, the DU 1530, and the RU 1540 (each component indicated with dotted lines to signify that each component may or may not be included in the base station 102 or 180). The base station 102 or 180 provides an access point to the core network 120 for a UE 104.

Figure 16:
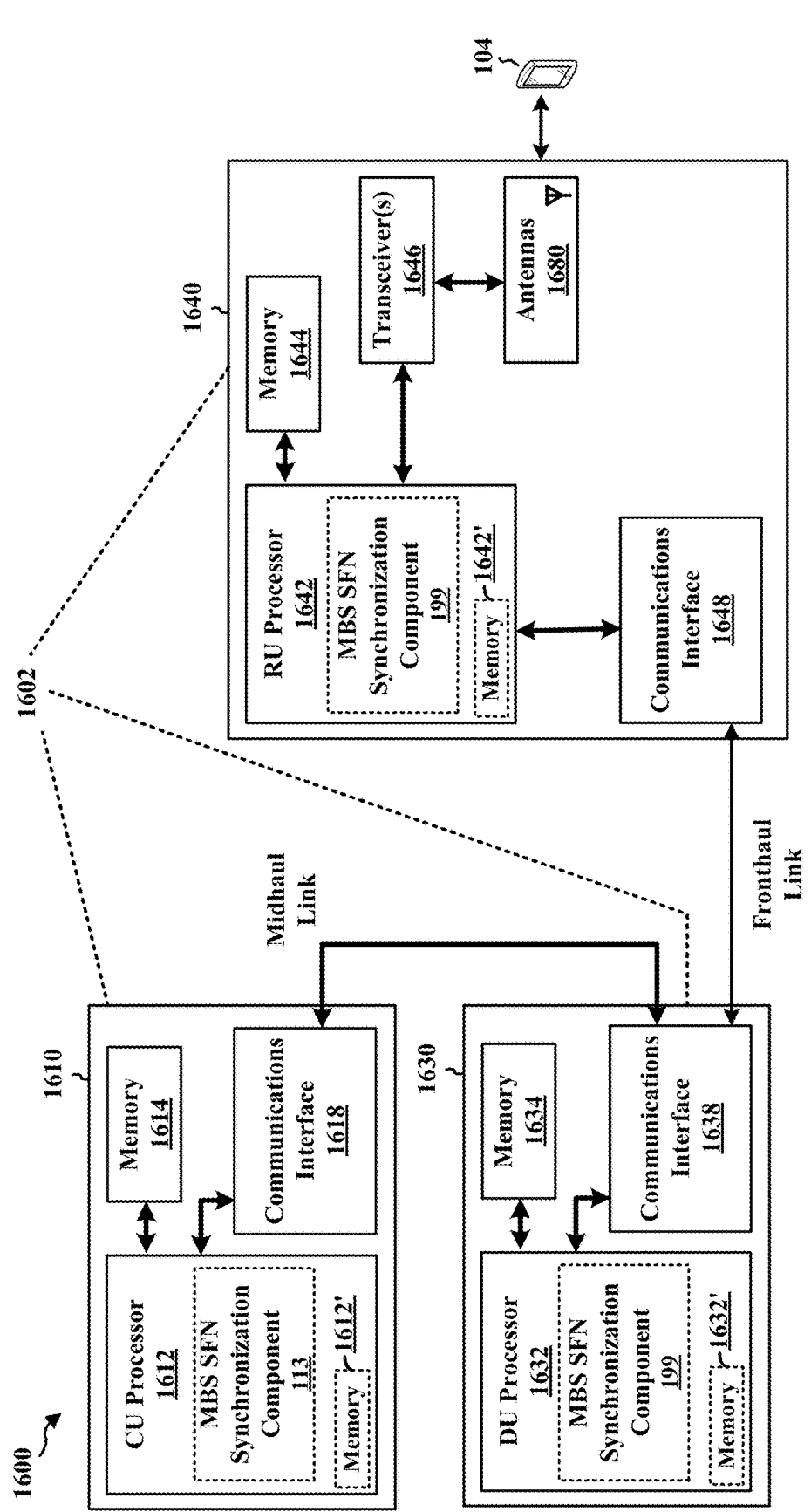
FIG. 16 is a diagram illustrating an example of a hardware implementation for a network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610 (e.g., CU 106, 608, 702, 1008, 1009; the network node 1402), a DU 1630 (e.g., DU 105, 604, 606, 704, 706, 708, 1004, 1006; the network node 1202), or an RU 1640. For example, depending on the layer functionality, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with one or more DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with one or more RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the MBS SFN synchronization component 199 is configured to receive synchronization timing information for an MBS SFN data transmission in a synchronous manner with at least one additional DU, transmit the MBS SFN data transmission with a timing based on the synchronization timing information, e.g., as described in connection with FIG. 11A or 11B. The MBS SFN synchronization component 199 may be further configured to maintain a MCCH modification period and MCCH modification boundary in common with a CU, e.g., as described in connection with 1106 in FIG. 11A or 11B. The MBS SFN synchronization component 199 may include additional components that perform each of the blocks of the algorithm in the flowchart of FIG. 11A or FIG. 11B. As such, each block in the flowchart of FIG. 11A or FIG. 11B may be performed by a component and the apparatus may include one or more of those components. The MBS SFN synchronization component 199 may be within one or more processors of one or more of the DU 1630, and the RU 1640. The MBS SFN synchronization component 199 may be one or more hardware components specifically configured to carry out the stated processes/algorithm, implemented by one or more processors configured to perform the stated processes/algorithm, stored within a computer-readable medium for implementation by one or more processors, or some combination thereof.

The CU 1610 may include an MBS SFN synchronization component 113 configured to transmit synchronization timing information for an MBS SFN data transmission in a synchronous manner to multiple DUs, receive first synchronization timing information from at least one of an MBSTF or an MB-UPF, transmit the MBS SFN data transmission to the multiple DUs for synchronous transmission to one or more UEs, maintain a MCCH modification period and MCCH modification boundary in common with the multiple DUs, and/or perform MBS coordination with at least one additional CU and/or to receive MBS coordination from an additional CU, e.g., as described in connection with FIGS. 13A and/or 13B.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if" "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a DU, comprising: receiving synchronization timing information for an MBS SFN data transmission in a synchronous manner with at least one additional DU; and transmitting the MBS SFN data transmission with a timing based on the synchronization timing information.

In aspect 2, the method of aspect 1 further includes that the synchronization timing information for the MBS SFN data transmission is included in a SYNC PDU from a CU.

In aspect 3, the method of aspect 2 further includes that the SYNC PDU correspond to a synchronization PDU comprised in a GTP-U over an F1 interface.

In aspect 4, the method of aspect 2 or aspect 3 further includes that a synchronization protocol groups incoming packets into a synchronization sequence, wherein each packet includes a timestamp and a packet number.

In aspect 5, the method of aspect 1 further includes that the synchronization timing information for the MBS SFN data transmission is included in a synchronization IE comprised in a downlink UP container of an F1-U interface with a CU.

In aspect 6, the method of aspect 5 further includes that the synchronization timing information comprises a timestamp of a synchronization protocol added to downlink user data of an F1-U UP protocol.

In aspect 7, the method of aspect 5 or aspect 6 further includes that the synchronization IE further includes a packet number associated with the timestamp.

In aspect 8, the method of aspect 1 further includes that the synchronization timing information for the MBS SFN data transmission is included in a synchronization container in a GTP-U header from a CU.

In aspect 9, the method of aspect 8 further includes that the synchronization container further includes a frame control portion and a frame check portion of a synchronization PDU, a payload of the synchronization PDU being carried by a GTP-U payload.

In aspect 10, the method of any of aspects 1-9 further includes that at least one additional DU is associated with a different CU than the DU.

In aspect 11, the method of any of aspects 1-10 further includes maintaining an MCCH modification period and MCCH modification boundary in common with a CU.

In aspect 12, the method of any of aspects 1-11 further includes that an MCCH for an MBS SFN area served by the DU is based on an extended cyclic prefix (ECP).

In aspect 13, the method of any of aspects 1-12 further includes that an ECP based MBS SFN area configuration is comprised in a normal cyclic prefix (NCP) MCCH.

In aspect 14, the method of any of aspects 1-12 further includes that an ECP based MBS SFN area configuration is comprised in the MCCH based on the ECP.

Aspect 15 is an apparatus for wireless communication including at least one processor coupled to a memory, the at least one processor configured to perform the method of any of aspects 1-14.

In aspect 16, the apparatus of aspect 15 further includes at least one of an antenna or a transceiver coupled to the at least one processor.

Aspect 17 is an apparatus for wireless communication including means for performing the method of any of aspects 1-14.

In aspect 18, the apparatus of aspect 17 further includes at least one of an antenna or a transceiver.

Aspect 19 is a non-transitory computer-readable medium storing computer executable code, where the code when executed by a processor causes the processor to implement any of aspects 1-14.

Aspect 20 is a method of wireless communication at a CU, comprising: transmitting synchronization timing information for a MBS SFN data transmission in a synchronous manner to multiple DUs; and transmitting the MBS SFN data transmission to the multiple DUs for synchronous transmission to one or more UEs.

In aspect 21, the method of aspect 20 further includes that the synchronization timing information for the MBS SFN data transmission is included in a SYNC PDU to the multiple DUs.

In aspect 22, the method of aspect 21 further includes that the SYNC PDU correspond to a synchronization PDU comprised in a general packet radio service tunneling protocol (GTP-U) over an F1 interface.

In aspect 23, the method of aspect 21 or 22 further includes that a synchronization protocol groups incoming packets into a synchronization sequence, wherein each packet includes a timestamp and a packet number.

In aspect 24, the method of aspect 20 further includes that the synchronization timing information for the MBS SFN data transmission is included in a synchronization IE comprised in a UP container of an F1-U interface with the multiple DUs.

In aspect 25, the method of aspect 24 further includes that the synchronization timing information comprises a timestamp of a synchronization protocol added to downlink user data of an F1-U UP protocol.

In aspect 26, the method of aspect 24 or 25 further includes that the synchronization IE further includes a packet number associated with the timestamp.

In aspect 27, the method of aspect 20 further includes that the synchronization timing information for the MBS SFN data transmission is included in a synchronization container in a GTP-U header to the multiple DUs.

In aspect 28, the method of aspect 27 further includes that the synchronization container further includes a frame control portion and a frame check portion of a synchronization PDU, a payload of the synchronization PDU being carried by a GTP-U payload.

In aspect 29, the method of any of aspects 20-28 further includes that receiving first synchronization timing information from at least one of a MBSTF or a MB-UPF, the synchronization timing information transmitted to the multiple DUs being second synchronization timing information that is based on the first synchronization timing information from the at least one of the MBSTF or the MB-UPF.

In aspect 30, the method of aspect 29 further includes that the first synchronization timing information is provided for PDU session and second synchronization timing information is provided for an MRB.

In aspect 31, the method of aspect 29 or 30 further includes performing MBS coordination with at least one additional CU.

In aspect 32, the method of aspect 31 further includes that the MBS coordination includes at least one of: MBS admission control, MBS service radio resource allocation, MRB establishment, or a counting procedure for staring, stopping, or suspending an MBS session.

In aspect 33, the method of aspect 29 or 30 further includes receiving MBS coordination from at least one additional CU, wherein the MBS coordination includes at least one of: MBS admission control, MBS service radio resource allocation, MRB establishment, or a counting procedure for staring, stopping, or suspending an MBS session.

In aspect 34, the method of any of aspects 29-33 further includes that the first synchronization timing information is received over a GTP-U tunnel between a core network and the CU for an MBS session, the method further comprising: synchronizing the MBS session or an MBS flow based on the synchronization timing information.

In aspect 35, the method of any of aspects 20-34 further includes maintaining a MCCH modification period and MCCH modification boundary in common with the multiple DUs.

Aspect 36 is an apparatus for wireless communication including at least one processor coupled to a memory, the at least one processor configured to perform the method of any of aspects 20-25.

In aspect 37, the apparatus of aspect 36 further includes at least one of an antenna or a transceiver coupled to the at least one processor.

Aspect 38 is an apparatus for wireless communication including means for performing the method of any of aspects 20-25.

In aspect 39, the apparatus of aspect 38 further includes at least one of an antenna or a transceiver.

Aspect 40 is a non-transitory computer-readable medium storing computer executable code, where the code when executed by a processor causes the processor to implement any of aspects 20-25.

What is claimed is:

1. An apparatus for wireless communication at a distributed unit (DU), comprising:
   memory; and
   at least one processor coupled to the memory, the at least one processor configured to:
      receive, from a central unit (CU) of a plurality of CUs, a downlink user plane (UP) container based on an F1-U UP protocol, wherein the downlink UP container includes:
      downlink user data for a multicast broadcast service (MBS) single frequency network (SFN) data transmission,
      a sequence number for packet loss detection, and
      a synchronization information element (IE) that indicates synchronization timing information for the MBS SFN data transmission in a synchronous manner with at least one additional DU, wherein the synchronization IE includes:
         a timestamp of a synchronization protocol added to the downlink user data, and
         a packet number associated with the timestamp, wherein the packet number is regenerated based on another packet number in a core network-radio access network (CN-RAN) synchronization protocol between the plurality of CUs and the core network; and
      send the MBS SFN data transmission with a timing based on the synchronization timing information received from the CU.

2. The apparatus of claim 1, wherein the at least one processor is further configured to receive additional synchronization timing information for the MBS SFN data transmission in a synchronization (SYNC) protocol data unit (PDU) from the CU.

3. The apparatus of claim 2, wherein the SYNC PDU correspond to a synchronization PDU comprised in a general packet radio service tunneling protocol (GTP-U) over an F1 interface.

4. The apparatus of claim 2, wherein a synchronization protocol groups incoming packets into a synchronization sequence, wherein each packet includes an additional timestamp and an additional packet number.

5. The apparatus of claim 1, wherein the downlink UP container is received via an F1-U interface with the CU.

6. The apparatus of claim 1, wherein the at least one processor is further configured to receive additional synchronization timing information for the MBS SFN data transmission in a synchronization container in a general packet radio service tunneling protocol (GTP-U) header from the CU.

7. The apparatus of claim 6, wherein the synchronization container further includes a frame control portion and a frame check portion of a synchronization protocol data unit (PDU), a payload of the synchronization PDU that is carried by a GTP-U payload.

8. The apparatus of claim 1, wherein the at least one additional DU is associated with a different CU than the DU.

9. The apparatus of claim 1, further comprising:
   at least one antenna coupled to the at least one processor, wherein the at least one processor is further configured to:
      maintain a multicast control channel (MCCH) modification period and MCCH modification boundary in common with the CU.

10. The apparatus of claim 9, wherein the MCCH for an MBS SFN area served by the DU is based on an extended cyclic prefix (ECP), wherein an ECP based MBS SFN area configuration is comprised in a normal cyclic prefix (NCP) MCCH or in the MCCH based on the ECP.

11. A method of wireless communication at a distributed unit (DU), comprising:
   receiving, from a central unit (CU) of a plurality of CUs, a downlink user plane (UP) container based on an F1-U UP protocol, wherein the downlink UP container includes:
      downlink user data for a multicast broadcast service (MBS) single frequency network (SFN) data transmission,
      a sequence number for packet loss detection, and
      a synchronization information element (IE) that indicates synchronization timing information for the MBS SFN data transmission in a synchronous manner with at least one additional DU, wherein the synchronization IE includes:
         a timestamp of a synchronization protocol added to the downlink user data, and
         a packet number associated with the timestamp, wherein the packet number is regenerated based on another packet number in a core network-radio access network (CN-RAN) synchronization protocol between the plurality of CUs and the core network; and
      sending the MBS SFN data transmission with a timing based on the synchronization timing information received from the CU.

12. An apparatus for wireless communication at a central unit (CU) of a plurality of CUs, comprising:
   memory; and
   at least one processor coupled to the memory, the at least one processor configured to:
      send a downlink user plane (UP) container based on an F1-U UP protocol, wherein the downlink UP container includes:
      downlink user data for a multicast broadcast service (MBS) single frequency network (SFN) data transmission,
      a sequence number for packet loss detection, and
      a synchronization information element (IE) that indicates synchronization timing information for the MBS SFN data transmission in a synchronous manner to multiple distributed units (DUs), wherein the synchronization IE includes:
         a timestamp of a synchronization protocol added to the downlink user data, and
         a packet number associated with the timestamp, wherein the packet number is regenerated based on another packet number in a core network-radio access network (CN-RAN) synchronization protocol between the plurality of CUs and the core network; and send the MBS SFN data transmission to the multiple DUs for synchronous transmission to one or more user equipments (UEs).

13. The apparatus of claim 12, further comprising:

at least one antenna coupled to the at least one processor, wherein the at least one antenna is further configured to provide additional synchronization timing information for the MBS SFN data transmission in a synchronization (SYNC) protocol data unit (PDU) to the multiple DUs.

14. The apparatus of claim 13, wherein the SYNC PDU correspond to a synchronization PDU comprised in a general packet radio service tunneling protocol (GTP-U) over an F1 interface.

15. The apparatus of claim 13, wherein a synchronization protocol groups incoming packets into a synchronization sequence, wherein each packet includes an additional timestamp and an additional packet number.

16. The apparatus of claim 12, wherein the UP container is provided via an F1-U interface with the multiple DUs.

17. The apparatus of claim 12, further comprising providing additional synchronization timing information for the MBS SFN data transmission in a synchronization container in a general packet radio service tunneling protocol (GTP-U) header to the multiple DUs.

18. The apparatus of claim 17, wherein the synchronization container further includes a frame control portion and a frame check portion of a synchronization protocol data unit (PDU), a payload of the synchronization PDU that is carried by a GTP-U payload.

19. The apparatus of claim 12, wherein the at least one processor is further configured to:

receive first synchronization timing information from at least one of a multicast broadcast service transfer function (MBSTF) or a multicast broadcast user plane function (MB-UPF), wherein the synchronization timing information sent to the multiple DUs includes second synchronization timing information that is based on the first synchronization timing information from the at least one of the MBSTF or the MB-UPF.

20. The apparatus of claim 19, wherein the first synchronization timing information is provided for PDU session and the second synchronization timing information is provided for an MBS radio bearer (MRB).

21. The apparatus of claim 19, wherein the at least one processor is further configured to:

perform MBS coordination with at least one additional CU.

22. The apparatus of claim 21, wherein the MBS coordination includes at least one of:

MBS admission control,

MBS service radio resource allocation,

MBS radio bearer (MRB) establishment, or a counting procedure for starting, stopping, or suspending an MBS session.

23. The apparatus of claim 19, wherein the at least one processor is further configured to:

receive MBS coordination from at least one additional CU, wherein the MBS coordination includes at least one of:

MBS admission control,

MBS service radio resource allocation,

MBS radio bearer (MRB) establishment, or a counting procedure for starting, stopping, or suspending an MBS session.

24. The apparatus of claim 19, wherein the first synchronization timing information is received over a general packet radio service tunneling protocol (GTP-U) tunnel between a core network and the CU for an MBS session, the at least one processor being further configured to:

synchronize the MBS session or an MBS flow based on the synchronization timing information.

25. The apparatus of claim 12, wherein the at least one processor is further configured to:

maintain a multicast control channel (MCCH) modification period and MCCH modification boundary in common with the multiple DUs.

26. A method of wireless communication at a central unit (CU) of a plurality of CUs, comprising:

sending a downlink user plane (UP) container based on an F1-U UP protocol, wherein the downlink UP container includes:

downlink user data for a multicast broadcast service (MBS) single frequency network (SFN) data transmission, a sequence number for packet loss detection, and a synchronization information element (IE) that indicates synchronization timing information for the MBS SFN data transmission in a synchronous manner to multiple distributed units (DUs), wherein the synchronization IE includes:

a timestamp of a synchronization protocol added to the downlink user data, and a packet number associated with the timestamp, wherein the packet number is regenerated based on another packet number in a core network-radio access network (CN-RAN) synchronization protocol between the plurality of CUs and the core network; and sending the MBS SFN data transmission to the multiple DUs for synchronous transmission to one or more user equipments (UEs).

27. The method of claim 11, wherein the at least one additional DU is associated with a different CU than the DU.

28. The method of claim 11, further comprising:

maintaining a multicast control channel (MCCH) modification period and MCCH modification boundary in common with the CU, wherein the MCCH for an MBS SFN area served by the DU is based on an extended cyclic prefix (ECP), wherein an ECP based MBS SFN area configuration is comprised in a normal cyclic prefix (NCP) MCCH or in the MCCH based on the ECP.

29. The method of claim 26, further comprising:

receiving first synchronization timing information from at least one of a multicast broadcast service transfer function (MBSTF) or a multicast broadcast user plane function (MB-UPF), wherein the synchronization timing information sent to the multiple DUs includes second synchronization timing information that is based on the first synchronization timing information from the at least one of the MBSTF or the MB-UPF.

30. The method of claim 29, further comprising:

performing MBS coordination with at least one additional CU, wherein the MBS coordination includes at least one of:

MBS admission control,

MBS service radio resource allocation,

MBS radio bearer (MRB) establishment, or a counting procedure for starting, stopping, or suspending an MBS session.

31. The apparatus of claim 1, wherein the downlink UP container further includes a flag that indicates an existence of user data, and indications of a downlink discard packet data convergence protocol (PDCP) protocol data unit (PDU) sequence number and a downlink discard number of blocks.

\* \* \* \* \*